(12) United States Patent
Jeon et al.

(10) Patent No.: US 10,940,412 B2
(45) Date of Patent: Mar. 9, 2021

(54) PURIFICATION DEVICE

(71) Applicant: LG ELECTRONICS INC., Seoul (KR)

(72) Inventors: Jewook Jeon, Seoul (KR); Minho Kim, Seoul (KR); Youngseok Kim, Seoul (KR); Hoon Jang, Seoul (KR); Soonki Jung, Seoul (KR); Jingyu Ji, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 240 days.

(21) Appl. No.: 16/110,252

(22) Filed: Aug. 23, 2018

(65) Prior Publication Data

US 2019/0060803 A1   Feb. 28, 2019

(30) Foreign Application Priority Data

Aug. 24, 2017   (KR) .......................... 10-2017-0107574

(51) Int. Cl.
   *B01D 35/30* (2006.01)
   *C02F 1/00* (2006.01)

(52) U.S. Cl.
   CPC ........... *B01D 35/30* (2013.01); *B01D 35/303* (2013.01); *C02F 1/003* (2013.01);
   (Continued)

(58) Field of Classification Search
   CPC .... B01D 2201/0415; B01D 2201/0423; B01D 2201/301; B01D 35/04; B01D 35/18;
   (Continued)

(56) References Cited

U.S. PATENT DOCUMENTS 3,985,272 A    10/1976   Rodth
2007/0017376 A1  1/2007   Oehninger
(Continued)

FOREIGN PATENT DOCUMENTS

AU    2017423559    2/2019
AU    2018220139    3/2019
(Continued)

OTHER PUBLICATIONS

Australian Office Action dated May 3, 2019 issued in AU Application No. 2018222909.
(Continued)

*Primary Examiner* — Dirk R Bass
(74) *Attorney, Agent, or Firm* — KED & Associates, LLP

(57) ABSTRACT

A purification device comprises a main body having an open extending horizontally; a rotator in the opening to be rotatably mounted on the main body; and a manipulation structure spaced from and above the rotator and rotatably connected to a top face of the main body, the manipulation structure protruding forward of the main body. The device also includes a water-outlet module with a fixed cover fixed to the rotator through the opening, the fixed cover protruding forward of the main body, and a top of the fixed cover being connected to a bottom of the manipulation structure; a vertically-movable cover held in contact with the fixed cover; and a water-outlet nozzle mounted onto a bottom of the vertically-movable cover. When the vertically-movable cover rises to a highest level, a top of the vertically-movable cover is located in a space between the rotator and the manipulation structure.

19 Claims, 14 Drawing Sheets

(52) U.S. Cl.
CPC .... *B01D 2201/301* (2013.01); *B01D 2201/31* (2013.01); *C02F 2307/10* (2013.01)

(58) Field of Classification Search
CPC .. B01D 35/303; B01D 2201/31; B01D 35/30; C02F 1/003; C02F 2201/004; C02F 2201/005; C02F 2201/007; C02F 2307/10
See application file for complete search history.

(56) References Cited

U.S. PATENT DOCUMENTS

| | | |
|---|---|---|
| 2014/0251498 A1 | 9/2014 | Park et al. |
| 2017/0050836 A1 | 2/2017 | Yoon |
| 2017/0153056 A1 | 6/2017 | Kim et al. |
| 2019/0060803 A1 | 2/2019 | Jeon et al. |

FOREIGN PATENT DOCUMENTS

| | | |
|---|---|---|
| DE | 29810291 | 9/1998 |
| KR | 10-0650666 | 11/2006 |
| KR | 10-2010-0054580 | 5/2010 |
| KR | 10-1381803 | 4/2014 |
| KR | 10-2015-0004669 | 1/2015 |
| KR | 10-2017-0063454 | 6/2017 |

OTHER PUBLICATIONS

United States Office Action dated Mar. 30, 2020 issued in U.S. Appl. No. 16/114,709.
Korean Office Action dated Jul. 20, 2018 issued in KR Application No. 10-2017-0107574.
United States Office Action dated Apr. 13, 2020 issued in U.S. Appl. No. 16/114,915.
U.S. Appl. No. 16/114,767, filed Aug. 28, 2018.
U.S. Appl. No. 16/110,252, filed Aug. 23, 2018.
U.S. Appl. No. 16/114,827, filed Aug. 28, 2018.
U.S. Appl. No. 16/114,915, filed Aug. 28, 2018.
U.S. Appl. No. 16/114,709, filed Aug. 28, 2018.
Korean Office Action dated Oct. 10, 2019 issued in KR Application No. 10-2019-0089180.
United States Office Action dated Apr. 7, 2020 issued in U.S. Appl. No. 16/114,827.
Korean Office Action dated Jul. 20, 2018 issued in KR Application No. 10-2017-0110412.
Korean Office Action dated Jul. 20, 2018 issued in KR Application No. 10-2017-0108888.

PURIFICATION DEVICE

CROSS-REFERENCE TO RELATED APPLICATIONS

This application claims priority under 35 U.S.C. § 119 to Korean Patent Application No. 10-2017-0107574 filed on Aug. 24, 2017, whose entire disclosure is hereby incorporated by reference. This application is related to Korean Patent Application No. 10-2017-0110412 (corresponding to U.S. application Ser. No. 16/114,767), Korean Patent Application No. 10-2017-0110413 (corresponding to U.S. application Ser. No. 16/114,827), Korean Patent Application No. 10-2017-0110414 (corresponding to U.S. application Ser. No. 16/114,915), and Korean Patent Application No. 10-2017-0108888 (corresponding to U.S. application Ser. No. 16/114,709), whose disclosures are also incorporated by reference.

BACKGROUND

1. Field

The present disclosure relates to a purification device.

2. Background

Generally, a purification device filters water to remove impurities therefrom and is widely used in the home. A home purification device may be connected to a tap water supply and may remove floating or harmful components contained in tap water using a filter. The purification device may be configured to discharge a desired amount of water by manipulation of a user.

Nowadays, a variety of the above-described home purification devices having water purification function and discharge function of hot water and cold water are being introduced. In recent years, the purification device has been developed which may be small and thus installed in various installation environment.

Korean Patent No. 1381803 discloses a purification device in which a water outlet portion is provided on a top of a main body unit, the water outlet portion is separated from the main body unit, and is rotated by a predetermined angle, and then is re-coupled to the main body unit. In this purification device, the user may change the position of the water outlet portion to a predetermined position by detaching the water outlet portion from the main body unit and recombining the water outlet portion with the main body unit while maintaining the position of the main body unit. Thus, the purification device may be installed without being restricted in terms of the installation space of the purification device.

However, the purification device according to the prior art has the following disadvantages. First, there is an inconvenience that the water outlet portion is separated from the main body unit and recombined therewith in order to change the position of the water outlet portion. Further, there is a problem that separation and recombination sites may be damaged during the repeated separation and recombination of the water outlet portion.

Second, since the discharge pipe is connected to the water outlet portion, the discharge pipe may be damaged during the separation and recombination of the water outlet portion, which may lead to leakage of water. In addition, when the water outlet portion is repeatedly rotated, a fitting portion with the discharge pipe or the discharge pipe may be damaged, thereby resulting in leakage of water.

Third, the position of the water outlet portion is determined by a coupling groove defined in the main body unit. Therefore, the position of the water outlet portion may be limited only to the position of the groove, such that the position of the water outlet portion may not be changed to various positions.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Figure 1:
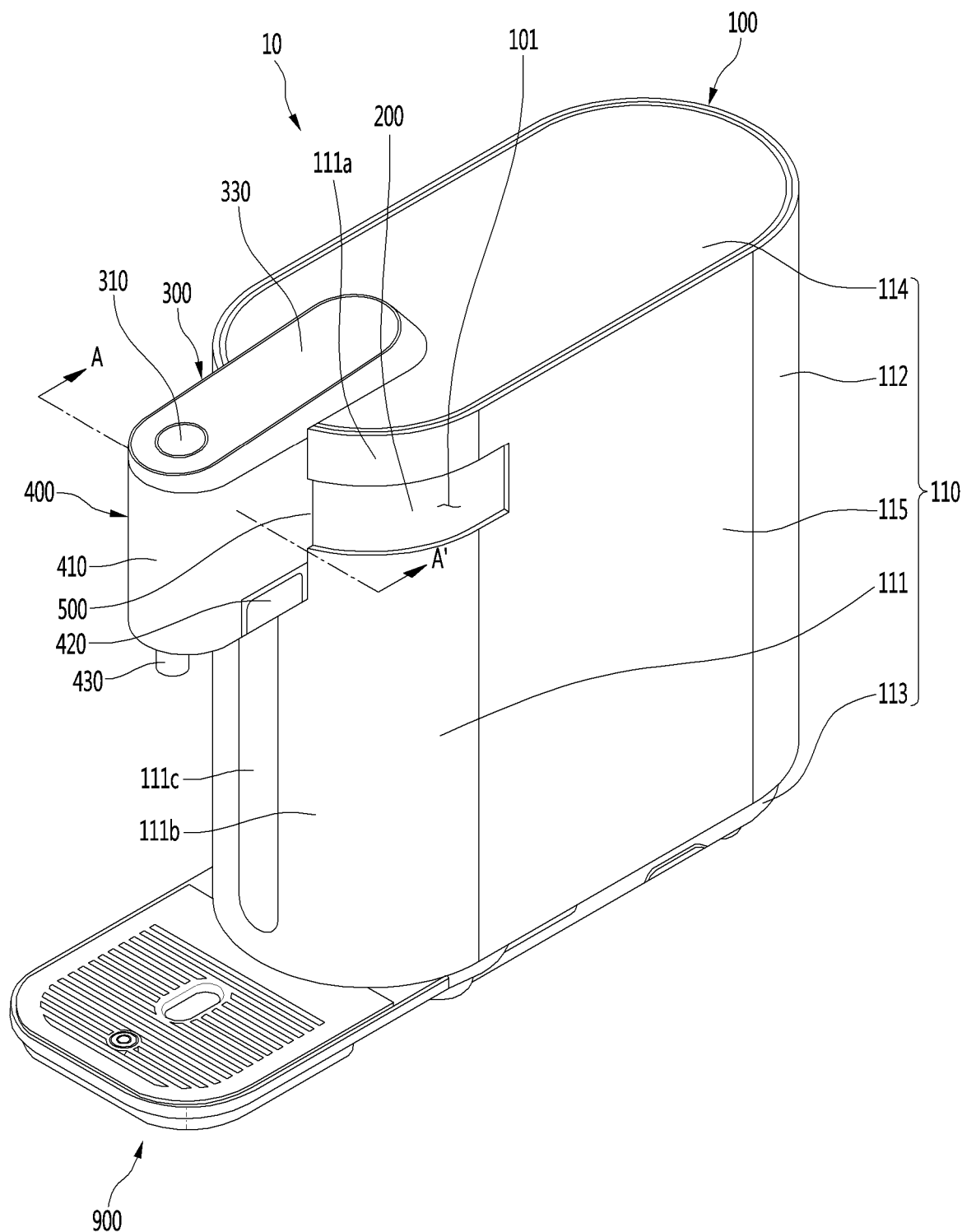
FIG. 1 is a perspective view of a purification device according to one embodiment of the present disclosure.

FIG. 1 is a perspective view of a purification device according to one embodiment of the present disclosure. Further, FIG. 2 is a perspective view of the purification device, with a position of a water-outlet nozzle being changed, according to one embodiment of the present disclosure.

Figure 2:
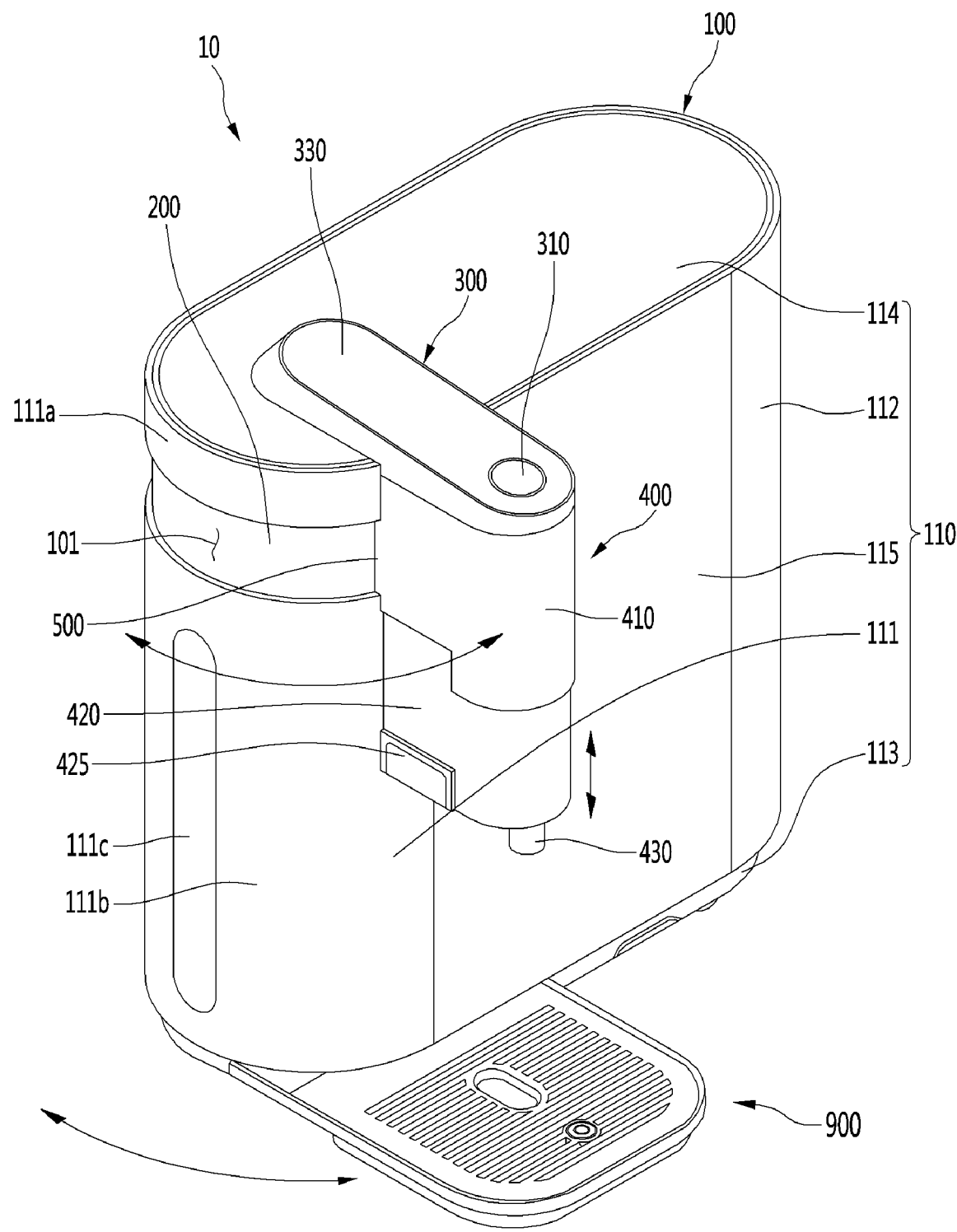
FIG. 2 is a perspective view of a state in which a location of the water-outlet nozzle of the purification device is changed, according to an embodiment of the present disclosure.

Referring to FIGS. 1 to 2, the purification device according to one embodiment of the present disclosure may include a main body 100 having an opening 101 opened horizontally in a front-face (or front surface) thereof, a rotator 200 received in the opening 101 and rotatably mounted to the main body 100, a manipulation structure (or handle) 300 positioned above the rotator 200 and spaced apart from the rotator, wherein at least a portion of the manipulation unit 300 protrudes forward of the main body 100, and a water-outlet module (or water outlet) 400. The water-outlet module 400 may include a fixed cover (or first cover) 410 fixed to the rotator 200 through the opening 101 and projecting forward of the main body 100 and having a top connected to a bottom of the manipulation structure 300, a vertically-movable cover (or second cover) 420 bearing against the fixed cover 410 and being movable in a vertical direction; and a water-outlet nozzle 430 mounted on a bottom of the vertically-movable cover 420.

According to the present disclosure, the water-outlet module 400 may be rotated in the left-right direction with respect to the main body 100 by the rotator 200. In addition, the vertically-movable cover 420 and the water-outlet nozzle 430 may be raised or lowered relative to the fixed cover 410 fixed to the rotator 200. Accordingly, the water-discharge nozzle 430 may be displaced in the left-right direction or in the up-down direction.

In addition, the manipulation structure 300 may be rotatably fixed to the top face (or top surface) of the main body 100. A front tip of the manipulation structure 300 may protrude forward of the main body 100 and may be engaged with the top of the water-outlet module 400. Accordingly, when the water-outlet module 400 rotates, the rotator 200 and the manipulation structure 300 connected to the water-outlet module 400 may rotate simultaneously.

In one example, a hollow portion may be formed in the top of the water-outlet module 400. In an inner surface of the module, a protrusion protruding inwardly may be formed. In addition, an inserted portion to be inserted into the hollow portion of the water-outlet module 400 may be formed from the bottom of the manipulation structure 300. A groove may be defined in the outer face of the inserted portion at a position corresponding to the protrusion. Accordingly, when the inserted portion formed from the bottom of the manipulation structure 300 is fitted into the hollow formed in the top of the water-outlet module 400, and the protrusion fits in the groove, the combination of the water-outlet module 400 and the manipulation structure 300 may be achieved. In one embodiment, the main body 100 has the housing 110 and a filter (not shown).

The external appearance of the purification device 10 may be defined by the housing 110. The housing 110 may include a front-cover 111 defining the appearance of the front-face, a rear-cover 112 defining the appearance of the rear-face, a base 113 defining the bottom face, a top-cover defining the top face 114, and left and right side-panels 115 defining both lateral faces. The front-cover 111, the rear-cover 112, the base 113, the top-cover 114 and a pair of the side-panels 115 may be assembled together to define the appearance of the purification device 10.

In this connection, the front end and the rear end of each of the base 113 and the top-cover 114 may be rounded. Thus, each of the front-cover 111 and the rear-cover 112 may be convexly formed forwardly and rearwardly, respectively so as to have a curvature corresponding to a curvature of the front end and the rear end of each of the base 113 and the top-cover 114. In the housing 110, the filter (not shown) for purifying raw-water introduced from the outside thereto and discharging the purified water is provided.

In the front face of the main body 100, the water-outlet module 400 is positioned so as to protrude forward therefrom. The purified water passing through the filter may be discharged through the water-outlet nozzle 430 protruding downward from the bottom of the water-outlet module 400. In addition, purified water passing through the filter may be cooled or heated and then supplied to the water-outlet nozzle 430 in the state of cold water and hot water.

In one embodiment, the front-cover 111 may include an upper cover 111a and a lower cover 111b. Further, the upper cover 111a and the lower cover 111b are vertically spaced from each other, and the opening 101 is defined in the space. The opening 101 may be shielded by the rotator 200 rotatably mounted on the main body 100. In this connection, the lower cover 111b may have a planar portion 111c extending in a vertical direction at a central portion thereof.

When the lower cover 111b has the planar portion 111c, this may allow following advantages compared with the case where the entire area of the lower cover 111b is formed convexly forwardly: when a user discharges water, there is an advantage in that the container including the cup may be positioned to a deeper position. There is also an advantage that the container including the cup, etc. may be stably supported.

In addition, when the water-outlet module 400 is rotated, there is the advantage that the module may be centered with reference to the planar portion 111c. In a state where the water-outlet module 400 is rotated left or right, a container including a cup, etc. may be stably supported from a corresponding side panel 115 having a planar shape.

The water-outlet module 400 may be configured to rotate with the rotator 200. Accordingly, the user may rotate the water-outlet module 400 at a desired angle depending on the installation state of the purification device 10 or the installation environment thereof. In addition, the manipulation structure 300 rotatably coupled to the top-cover 114 may be integrally coupled to the water-outlet module 400 and thus rotated with the water-outlet module 400.

In this connection, a user presses a water-discharge button 310 of the manipulation structure 300. The water-discharge button 310 is preferably positioned vertically overlapping the water-outlet module 400 such that the vertical downward force may be applied to the water-outlet module 400 when the water-discharge button 310 is pressed by the user. That is, when the user presses the water-discharge button 310, the vertical downward force is applied to the water-outlet module 400 such that the water-outlet module 400 does not rotate arbitrarily due to the pressing force from the user.

In addition, while the water-outlet module 400 is fixed to the outside of the rotator 200, the module 400 may be capable of moving in a vertical direction. The above-described rotation and vertical-movement operation of the water-outlet module 400 will be described later.

Figure 3:
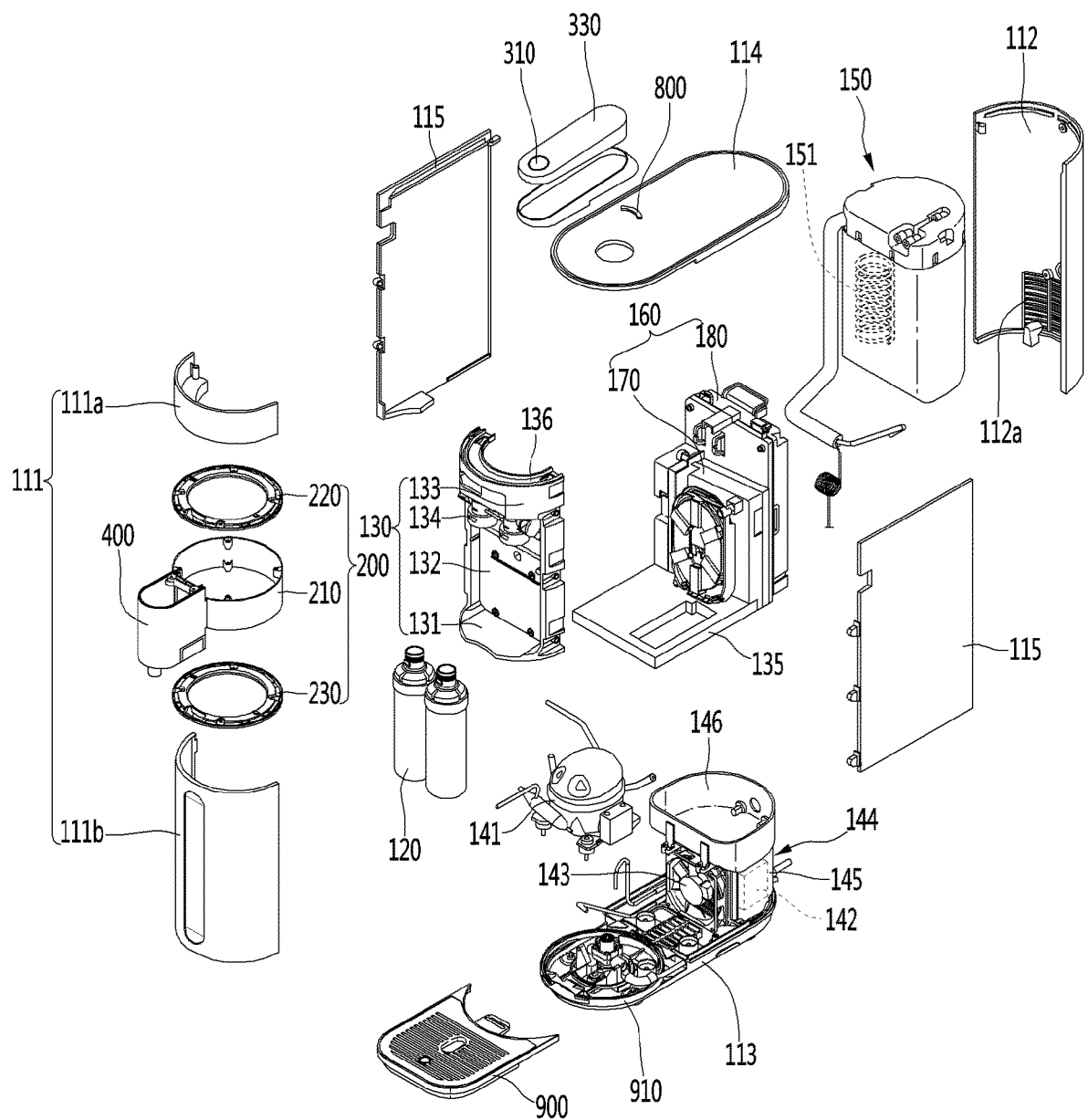
FIG. 3 is an exploded perspective view of the purification device according to one embodiment of the present disclosure.
Figure 4:
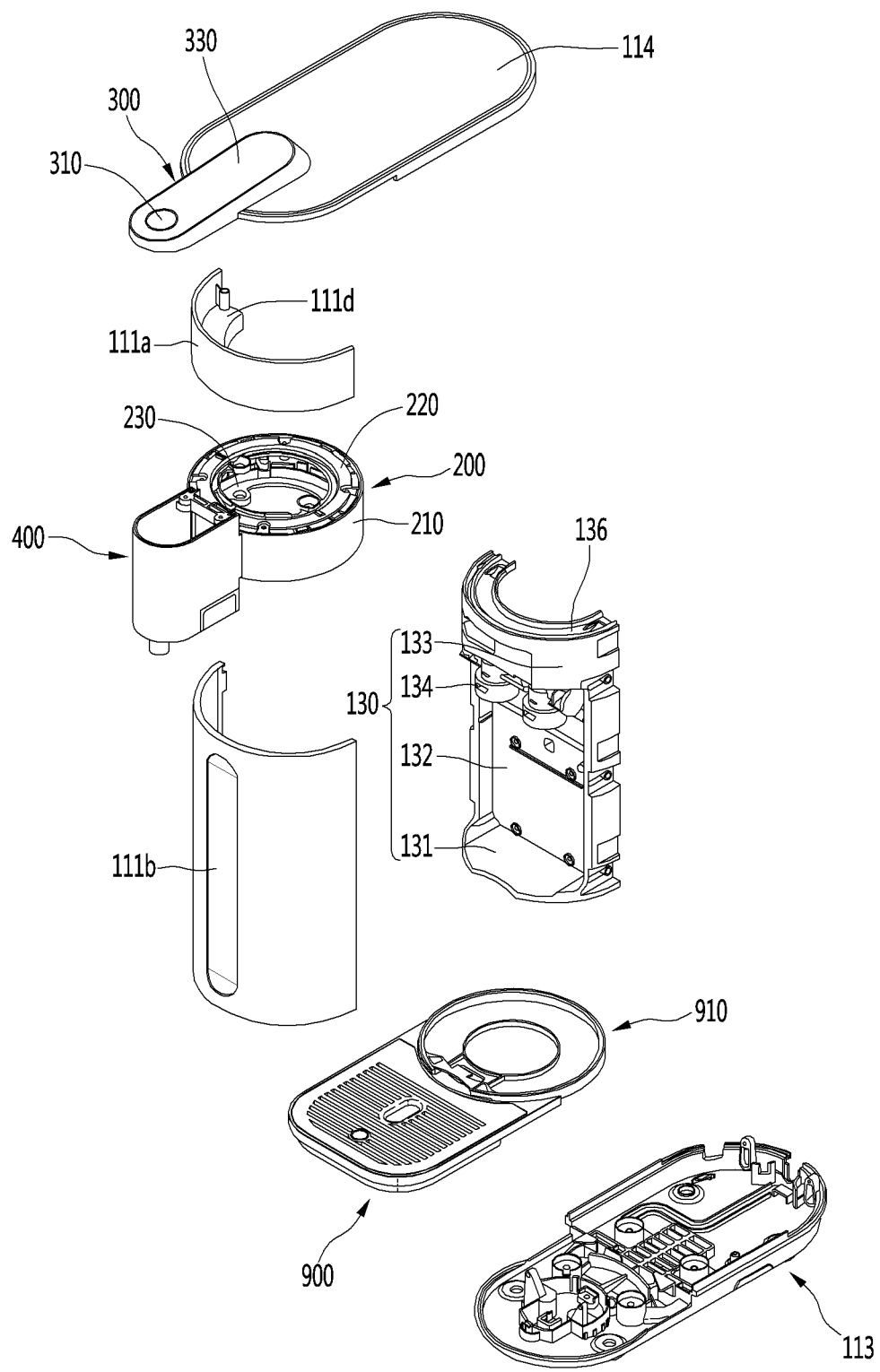
FIG. 4 is an exploded perspective view showing a portion of FIG. 3.

FIG. 3 is an exploded perspective view of the purification device according to an embodiment of the present disclosure. FIG. 4 is an exploded perspective view of a portion of FIG. 3. Referring to FIGS. 3 to 4, the housing 110 includes a filter 120 for purification of water and a filter bracket 130 to which a plurality of valves (not shown) are mounted.

The filter bracket 130 may include a bottom portion 131 coupled with the base 113, a filter receiving portion 132 in which the filter 120 is received, and a rotator mount 133 on which the rotator 200 is mounted. The shape of the bottom portion 131 may be formed to correspond to the shape of the tip of the base 113, and the portion 131 may be coupled to the base 113. Thus, the mounting position of the filter bracket 130 may be fixed via the coupling between the bottom portion 131 and the base 113. Further, the bottom face shape of the filter receiving portion 132 may be defined.

The filter bracket 130 may be hooked to the base 113 in a hook manner. The filter bracket 130 may be fixed by a screw fastened to the bottom face of the base 113. The filter receiving portion 132 extends in the vertical direction. The filter receiving portion 132 has a recessed space defined therein from a front side (left side in the figure) to a rear side (right side in the figure) so that the filter 120 may be accommodated therein. A plurality of the filters 120 may be mounted in the filter receiving portion 132. The filter 120 may include a combination of the filters having various functions and may be configured for purifying raw-water (tap water) to be supplied thereto.

Further, the filter receiving portion 132 may further include a filter socket 134 on which the filter 120 is mounted. The filter socket 134 is provided with piping for flowing purified water. The piping may be connected to a plurality of valves (not shown). Thus, the raw-water may pass through the filter 120 in turn and then to a water valve (not shown).

A plurality of valves (not shown) may be provided on the back face (right side in the drawing) of the filter receiving portion 132. The valves (not shown) may supply purified water having passed through the filter 120 to a cooling tank 150 for generating cold water or an induction heating assembly 170 for generating hot water. Furthermore, purified water may be supplied to the water-outlet module 400 immediately.

The rotator mount 133, on which the rotator 200 is rotatably mounted, may be formed on the top of the filter receiving portion 132. In this connection, the rotator mount 133 may be configured to have a curvature corresponding to the curvature of the front cover 111, specifically the lower cover 111b, which covers the front face of the rotator mount 133. Further, the manipulation structure 300 may be positioned on the water-outlet module 400 connected to the rotator 200 and the rotator 200.

In one embodiment, a compressor 113 and a condenser 142 are provided on the top face of the base 113. In addition, a cooling fan 143 is provided between the compressor 141 and the condenser 142 to realize cooling of the compressor 141 and the condenser 142. The compressor 141 may include the compressor of the inverter type capable of adjusting the cooling ability by varying the frequency. Therefore, the cooling of purified water may be efficiently performed, thereby reducing power consumption.

Further, the condenser 142 may be located behind the base 113 and may be located at a position corresponding to a discharge hole 112 a defined in the rear-cover 112. The condenser 142 may be realized by bending the flat tube type refrigerant tube many times in order to efficiently utilize the space and at the same time to improve the heat exchange efficiency. The condenser may be configured to be received within the condenser bracket 144.

The condenser bracket 144 may have a condenser mount 145 on which the condenser 142 may be fixed, and a tank mount 146 on which a cooling tank 150 for producing cold water may be mounted. The condenser mount 145 has a space defined therein having a shape corresponding to the overall shape of the condenser 142 so as to accommodate the condenser 142. Further, portions of the condenser mount 145 facing the cooling fan 143 and the discharge hole 112a are opened, respectively, whereby effective cooling of the condenser 142 is possible. Further, the tank mount 146 is formed on the condenser bracket 144, that is, on the condenser mount 145. The bottom portion of the cooling tank 150 is inserted into the tank mount 146 so that the tank mount 146 fixes the cooling tank 150.

The cooling tank 150 may be configured to cool purified water to generate cold water, and, to this end, may be filled with cooling water for heat exchange with the purified water. Further, an evaporator 151 for cooling the cooling water may be accommodated in the cooling tank 150. Further, purified water may pass through the inside of the cooling tank to cool the purified water.

The support bracket 130 is further provided at one side thereof with a support plate 135 extending toward the cooling tank 150. The support plate 135 is provided on the compressor 141. The plate 135 extends from the filter bracket 130 to the condenser bracket 144 to provide a space for receiving the heating and control module 160.

The heating and control module 160 may include an induction heating assembly 170 for generating hot water and a control assembly 180 for controlling the overall operation of the purification device 10. The induction heating assembly 170 and the control assembly 180 may be coupled to each other to form a single module. The induction heating assembly 170 and the control assembly 180 may be mounted on the support plate 135 in the combined state into the single module.

The induction heating assembly 170 is configured to heat purified water and to operate in induction heating (IH) mode. The induction heating assembly 170 may heat the water immediately and rapidly at the time of manipulation for hot water discharge. The heating assembly controls the output of the magnetic field so that purified water may be heated to a target temperature and supplied to a user. Thus, depending on the user's manipulation, the hot water at the target temperature may be discharged.

The control assembly 180 may be configured to control the operation of the purification device 10. The assembly 180 may be configured to control the compressor 141, the cooling fan 143, various valves and sensors, the induction heating assembly 170, and the like. The control assembly 180 may be configured as a module by a combination of PCBs (printed circuit boards) divided into a plurality of functional parts. In addition, when the purification device 10 discharges only cold water and purified water, a PCB for controlling the induction heating assembly 170 may be omitted. In this manner, the at least one PCB may be omitted. Hereinafter, the water-outlet module, which is a main component of the present disclosure, is illustrated.

Figure 5:
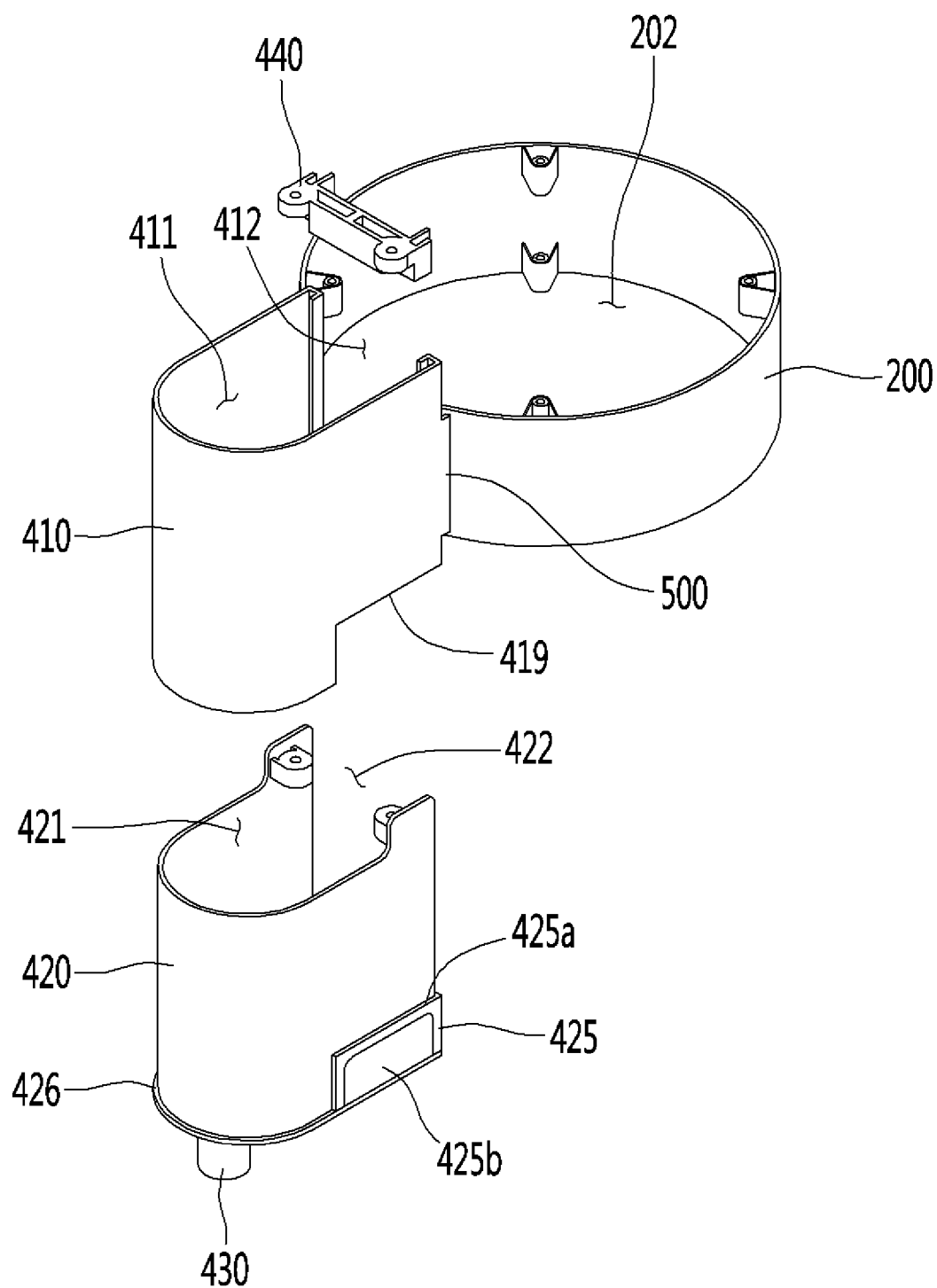
FIG. 5 is an exploded perspective view of the water-outlet module as one component of the present disclosure.
Figure 6:
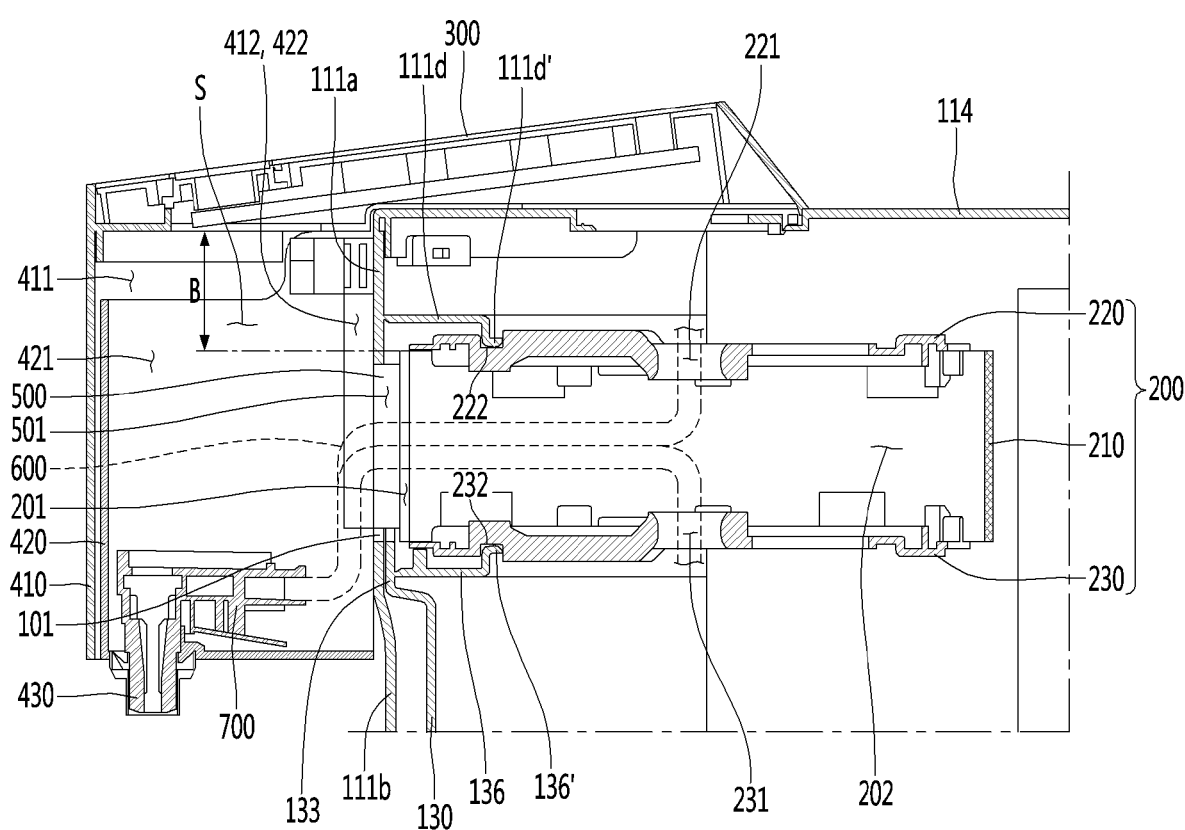
FIG. 6 is a vertical cross section view of the purification device according to one embodiment of the present disclosure.
Figure 7:
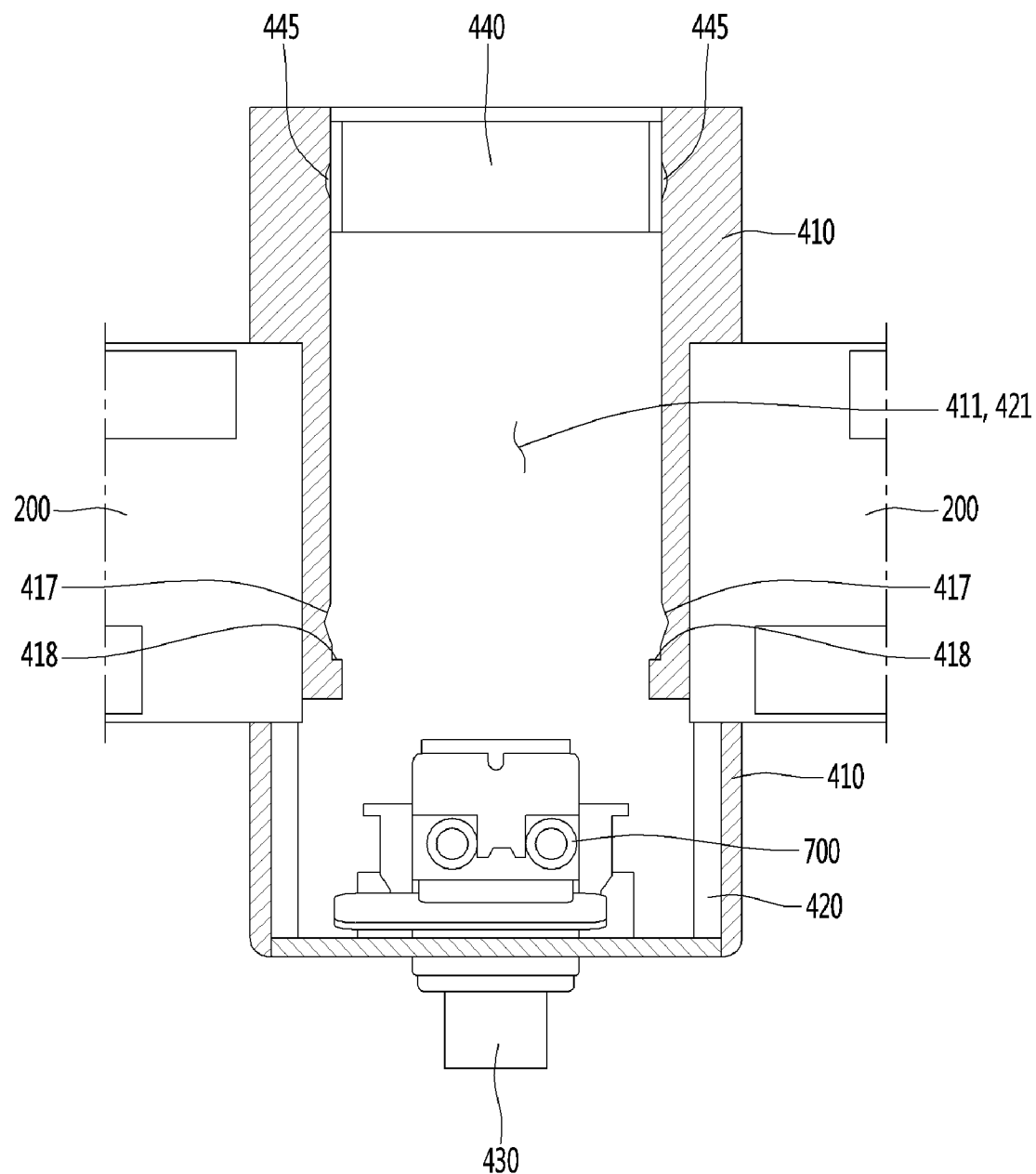
FIG. 7 is a cross-sectional view taken along line A-A' of FIG. 1.
Figure 8:
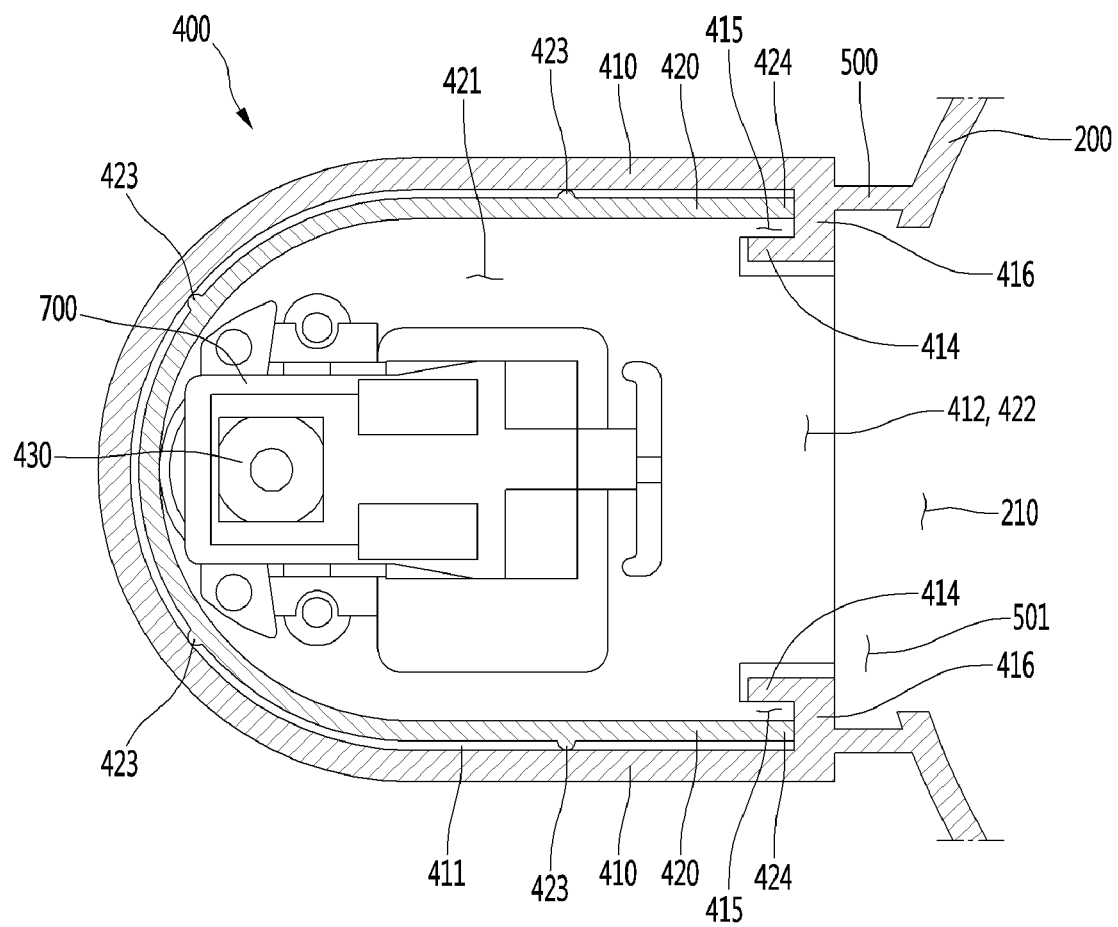
FIG. 8 is a horizontal cross-sectional view of the water-outlet module as one component of the present disclosure.

FIG. 5 is an exploded perspective view of the water-outlet module as a component of the present disclosure. FIG. 6 is a vertical cross-sectional view of the purification device according to one embodiment of the present disclosure. FIG. 7 is a cross-sectional view taken along the line A-A' in FIG. 1. FIG. 8 is a horizontal cross-sectional view of the water-outlet module as a component of the present disclosure.

Referring to FIG. 5 to FIG. 8, the water-outlet module 400 may include the front-cover fixed cover 410, the vertically-movable cover 420, and the water-outlet nozzle 430. The fixed cover 410 is secured to the rotator 200 positioned within the main body 100 through the opening 101 defined in the front cover 111. The cover 410 protrudes forward of the main body 100, and the top of the cover 410 is connected to the bottom of the manipulation structure 300. The vertically-movable cover 420 is movable up and down while being supported by the fixed cover 410. The water-outlet nozzle 430 is mounted on the bottom of the vertically-movable cover 420.

The water-outlet nozzle 430 is coupled to the bottom of the vertically-movable cover 420. When the vertically-movable cover 420 ascends and descends along the fixed cover 410, the position (height) in the vertical direction of the water-outlet nozzle 430 may vary.

Since as described below, the fixed cover 410 is fixed to the rotator 200, the vertically-movable cover 420 and the water-outlet nozzle 430 connected to the fixed cover 410 may be varied in position in the horizontal direction. In this connection, the top of the fixed cover 410 is connected to the bottom of the manipulation structure 300.

According to this configuration, in a spacing B between the rotator 200 and the manipulation structure 300, an accommodation space S may be defined. The top of the vertically-movable cover 420 may be located in the accommodation space S provided between the rotator 200 and the manipulation structure 300 when the vertically-movable cover 420 is maximally raised.

The length of the vertically-movable cover 420 may be increased by the accommodation space S as described above. As a result, the maximum rise level of the water-outlet nozzle 430 coupled to the vertically-movable cover 420 and the vertically-movable cover 420 may be further higher. In addition, the maximum descending level of the water-outlet nozzle 430 coupled to the vertically-movable cover 420 and the vertically-movable cover 420 may be further lowered. That is, the adjustable height variation of the water-outlet nozzle 430 coupled to the vertically-movable cover 420 and the vertically-movable cover 420 may be larger.

When the top of the fixed cover 410 is connected to the bottom of the manipulation structure 300 as described above, the top of the water-outlet module 400 is primarily supported by the manipulation structure 300 relative to the main body 100. Further, by the rotator 200, the bottom or center of the module 400 may be secondarily supported relative to the main body 100.

Accordingly, the water-outlet module 400 may be more rigidly connected to the main body 100. When the water-outlet module 400 is rotated or lifted, the water-outlet module 400 may be prevented from vibrating. In this embodiment, the device may further include a bridge 500 connecting the rotator 200 and the water-outlet module 400.

The bridge 500 integrally connects the rotator 200 and the fixed cover 410. The bridge 500 passes through the opening 101. Both ends of the bridge are fixed to the rotator 200 and the fixed cover 410, respectively. When the water-outlet module 400 and the rotator 200 are rotated, the bridge 500 moves along the opening 101.

In this embodiment, the bridge 500, the tip of the rotator 200 to which the bridge 500 is connected, the back of the fixed cover 410, and the back of the vertically-movable cover 420 (right side of the drawing) may have respectively fluid channels 201, 412, 422, and 501 defined therein, through which a hose may pass. The channels may communicate with each other. When the fluid channels 201, 412, 422, and 501 are defined as described above, the inner space of the main body 100 and the inner space of the vertically-movable cover 420 may communicate with each other.

Accordingly, the hose 600 for supplying at least one of purified water, cold water, and hot water as generated from the main body 100 may be connected to the water-outlet nozzle 430 provided in the vertically-movable cover 420 via the fluid channels 201, 412, 422, and 501. In one example, the hose 600 may include a purified water pipe supplying purified water and cold water, and a hot water pipe supplying hot water.

In this connection, the purified water pipe and the hot water pipe are made of a flexible material such as rubber, silicone, or the like, and may be bent or flattened. Thus, the pipe may be adapted to the vertical-movement movement of the vertically-movable cover 420.

When the vertically-movable cover 420 and the water-outlet nozzle 430 are lifted and lowered, the hose 600 may be adapted to the vertical movement of the vertically-movable cover 420, while bending or expanding, within the inner space 421 of the vertically-movable cover 420. Thus, regardless of the height of the vertically-movable cover 420 and the water-outlet nozzle 430, the cold water, purified water and hot water may be supplied to the water-outlet nozzle 430.

In one embodiment, the fixed cover 410 has an vertical-movement enabling space 411 defined therein. The vertically-movable cover 420 is accommodated in the vertical-movement enabling space 411 provided inside the fixed cover 410. The cover 420 may move up and down in the space 411 and thus vary the height of the water-discharge nozzle 430.

That is, while the vertically-movable cover 420 is accommodated in the fixed cover 410, the cover 420 moves up and down while entering or exiting the fixed cover 410 through the open bottom of the fixed cover 410. In one example, when the vertically-movable cover 420 is at its maximum vertical-movement, the vertically-movable cover 420 may be entirely housed within the fixed cover 410.

When the vertically-movable cover 420 is raised up as described above, the user holds the vertically-movable cover 420 and pulls the cover 420 downward. Thus, the vertically-movable cover 420 descends while being held in contact with the fixed cover 410. Thus, the cover 420 is exposed to the outside of the fixed cover 410.

Conversely, in a state where the vertically-movable cover 420 is lowered, the user pushes the vertically-movable cover 420 upward. Thus, the vertically-movable cover 420 is lifted up while being accommodated inside the fixed cover 410. In this manner, the vertically-movable cover 420 ascends and descends such that the height of the water-outlet nozzle 430 fixed to the vertically-movable cover 420 may vary.

The outer surface of the vertically-movable cover 420 may be shaped to correspond to the shape of the vertical-movement enabling space 411 of the fixed cover 410. In one embodiment, the at least portion of each of the fixed cover 410 and the vertically-movable cover 420 may have an arc-shaped cross-section. Alternatively, the fixed cover 410 and the vertically-movable cover 420 may have a circular cross-section. In another example, the at least portion of each of the fixed cover 410 and the vertically-movable cover 420 may have a straight cross-section. Alternatively, the fixed cover 410 and the vertically-movable cover 420 may have various cross-sectional shapes.

In addition, the vertically-movable cover 420 or the fixed cover 410 may be provided with a vertically-movable cover 420 for reducing the vertically-moving force applied to the vertically-movable cover 420. In this connection, the vertically-moving force applied to the vertically-movable cover 420 refers to all forces that affect the vertical movement of the vertically-movable cover 420.

In one example, the vertically-moving force may include: a force by which the user pulls the vertically-movable cover 420 downward to lower the vertically-movable cover 420, a force by which the user pushes the vertically-movable cover 420 upward to raise the vertically-movable cover 420, and a force by which the vertically-movable cover 420 descends by gravity, etc.

When as described above, the vertically-movable cover 420 moves vertically with respect to the fixed cover 410, the vertically-movable cover 420 may be lowered arbitrarily by its own weight. In detail, with the vertically-movable cover 420 fully housed within the fixed cover 410, the self-weight of the vertically-movable cover 420 may cause the vertically-movable cover 420 to fall out of the fixed cover 410. Alternatively, when the user holds the vertically-movable cover 420 and descends to the target position, and, then, the user releases his/her hand from the vertically-movable cover 420, the vertically-movable cover 420 may be further lowered by its own weight without being fixed in place. That is, it is difficult to maintain the height of the vertically-movable cover 420 due to the self-weight thereof.

According to the present disclosure, in order to prevent such a situation, the fixed cover 410 or the vertically-movable cover 420 has the resisting means. The resisting means reduces the vertically-moving force exerted on the vertically-movable cover 420 for an upward or downward movement of the vertically-movable cover 420.

Thus, with the vertically-movable cover 420 fully housed within the fixed cover 410, the resistance means may allow the vertically-movable cover 420 to be held in place in the accommodated state without being lowered by its own weight. Furthermore, even when, with the vertically-movable cover 420 being held at the target position, or being raised or lowered to the target position by the user, a user releases his/her hand from the vertically-movable cover 420, the vertically-movable cover 420 may be held at the target position. Thus, with the user positioning the water-outlet nozzle 430 at the target height, the user may proceed to discharge water.

In this connection, the resisting means is configured to prevent the vertically-movable cover 420 from falling due to its own weight. The resisting force of the resisting means must be selected to the extent that it does not exert too much force on the user not to manipulate the vertically-movable cover 420 for vertical movement. In addition, the resistive force should be employed to the extent that the user may have improved sense of manipulation felt while vertically moving the vertically-movable cover 420.

The resisting means may include a material including rubber, etc. having a frictional force, or a material including a viscous oil, etc. Alternatively, the resistance means may be implemented in various embodiments, to the extent that it can reduce the vertically-moving force exerted on the vertically-movable cover 420.

In one example, the resisting means may include at least one resisting protrusion 423. The at least one resisting protrusion 423 protrudes outward along the vertical direction from one face of the vertically-movable cover 420 facing the fixed cover 410. The protrusion 423 may linearly-contact the fixed cover 410 when the vertically-movable cover 420 moves.

In another example, the resisting means may include at least one resisting protrusion (not shown) protruding outward along the vertical direction from one face of the fixed cover 410 facing the vertically-movable cover 420. The protrusion (not shown) may linearly-contact the vertically-movable cover 420 when the cover 420 moves.

In this connection, the term 'linearly-contact' means that in the cross-section shown in FIG. 8, while the fixed cover 410 and the vertically-movable cover 420 are point-contacted with each other, this point-contact extends continuously along the vertical movement direction of the vertically-movable cover 420. Thus, the linearly-contact 'means that the fixed cover 410 and the vertically-movable cover 420 contact linearly along the direction of vertical movement of the vertically-movable cover 420.

For this purpose, at least one resisting protrusion 423 may be formed along the vertical movement direction of the vertically-movable cover 420 on the fixed cover 410 or the vertically-movable cover 420. In a variant example, when the resisting protrusion 423 is formed on the vertically-movable cover 420, a groove (not shown) may be defined in the fixed cover 410 at a position corresponding to the resisting protrusion 423.

When the fixed cover 410 and the vertically-movable cover 420 are linearly-contacted with each other via the resisting protrusion 423 as described above, the friction between the fixed cover 410 and the vertically-movable cover 420 is minimized, while the fixed cover 410 and the vertically-movable cover 420 are contacted (linearly-contacted) and supported with each other. Thus, the vertical movement of the vertically-movable cover 420 may be stabilized. In addition, deformation, including warping of the fixed cover 410 and the vertically-movable cover 420, may be prevented as much as possible due to the mutual contact support as mentioned above.

In addition, the user may vertically move the vertically-movable cover 420 without applying great force, thereby improving the manipulation sensitivity the user feels. In addition, the resisting protrusion 423 secures a predetermined clamping force to the vertically-movable cover 420 so that the vertically-movable cover 420 does not descend arbitrarily but is fixed at a height designated by the user.

In one example, the resisting protrusion 423 may have a convex semicircular cross-section. When the resisting protrusion 423 is formed to have a curved surface as described above, the vertical movement of the vertically-movable cover 420 may be performed more smoothly in a state in which the fixed cover 410 and the vertically-movable cover 420 are linearly-contacted. In addition, the number of resisting protrusions 423 may be at least two.

Further, when, with the vertically-movable cover 420 in contact with the fixed cover 410 as described above, the cover 420 is repeatedly moved vertically, noise is generated from the friction between the fixed cover 410 and the vertically-movable cover 420. Further, wear may occur at the contact area between the fixed cover 410 and the vertically-movable cover 420. Furthermore, manipulation for vertical movement of the vertically-movable cover 420 by the user may be difficult. To prevent this situation, the fixed cover 410 and the vertically-movable cover 420 may be made of materials different from each other.

In one example, one of the vertically-movable cover 420 and the fixed cover 410 may be made of one of an ABS resin (acrylonitrile-butadiene-styrene resin) and a POM (polyoxymethylene) material, while the other of the vertically-movable cover 420 and the fixed cover 410 may be made of the other of an ABS resin (acrylonitrile-butadiene-styrene resin) and a POM (polyoxymethylene) material. Alternatively, a variety of well-known engineering plastics having excellent fatigue resistance, toughness, abrasion resistance, and lubricity may be employed instead of POM (polyoxymethylene). Therefore, when the vertically-movable cover 420 is vertically moved, wear and noise due to the friction between the fixed cover 410 and the vertically-movable cover 420 can be reduced. Moreover, the feeling of the manipulation that the user feels may be improved.

Figure 9:
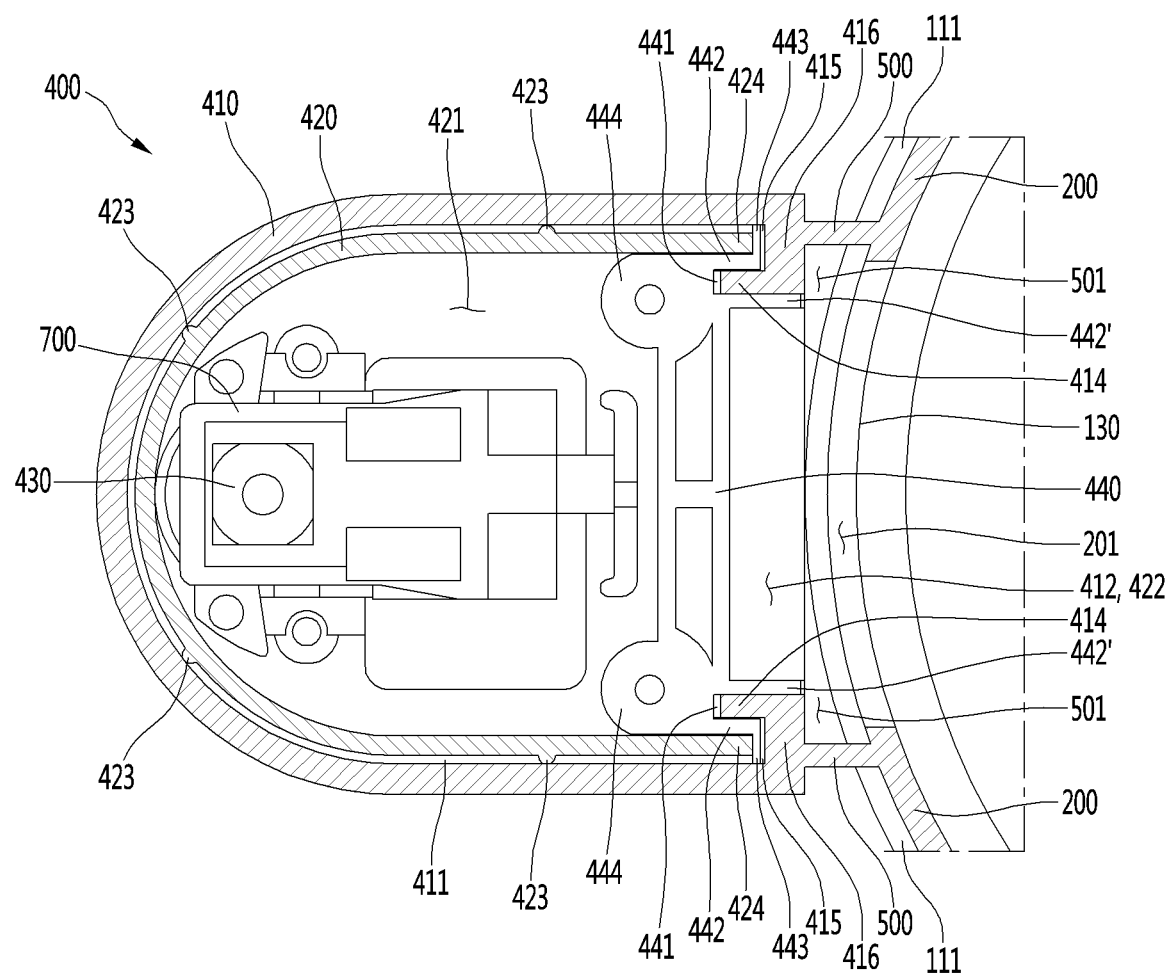
FIG. 9 is a horizontal cross-sectional view showing a guide bracket provided for the water-outlet module as one component of the present disclosure.
Figure 10:
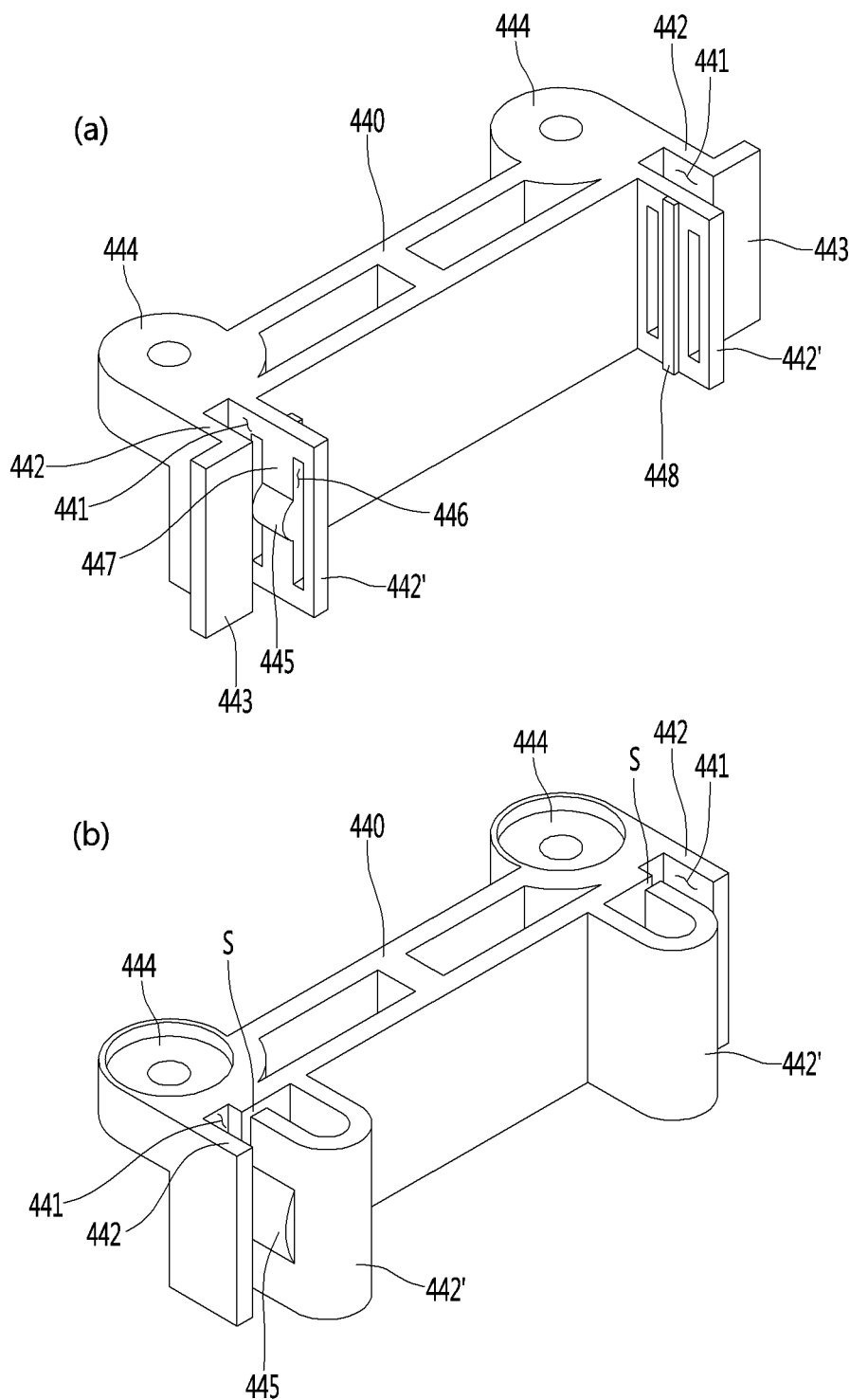
FIG. 10 is a perspective view of a guide bracket as one component of the present disclosure.

FIG. 9 is a cross-sectional view showing a guide bracket attached to the water-outlet module as one component of the present disclosure. FIG. 10 is a perspective view of the guide bracket as one component of the present disclosure. Referring to FIGS. 9 to 10, the vertically-movable cover 420 or the fixed cover 410 includes a guide for guiding the vertically-movable cover 420 to move in a straight line.

The vertically-movable cover 420 is vertically moved while being accommodated in the fixed cover 410. At this time, the vertical movement of the vertically-movable cover 420 may be guided in a straight line by the fixed cover 410. However, when the vertically-movable cover 420 is exposed outside the fixed cover 410, the vertically-movable cover 420 may sway to the left or right. In this case, the vertical movement of the vertically-movable cover 420 progresses unstably. When these unstable movements are repeated, this results in deformation and damage of the fixed cover 410 or the vertically-movable cover 420.

In accordance with the present disclosure, to prevent this situation, the device has a separate guide. The guide may be configured in various manners to guide the cover 420 such that the vertically-movable cover 420 may be vertically moved in a straight line without moving in the left-right direction or front-rearward direction while the vertically-movable cover 420 is supported by the fixed cover 410.

In one example, the vertically-movable cover 420 may have a first guide groove 441 defined inwardly, or a first guide protrusions 442 and 442' protruding outwardly. In this connection, on the fixed cover 410, a second guide protrusion 414 inserted into the first guide groove 441 or a second guide groove 415 accommodating the first guide protrusion 442 may be formed along the vertical direction.

Referring to FIG. 9, on the vertically-movable cover 420, the first guide groove 441 and the first guide protrusions 442 and 442' may be formed, while, on the fixed cover 410, the second guide protrusion 414 and the second guide groove 415 may be formed. In this case, with the second guide protrusion 414 being fitted in the first guide groove 441 and the first guide protrusion 442 being fitted in the second guide groove 415, the vertically-movable cover 420 moves vertically. Thereby, the vertically-movable cover 420 may be moved vertically in a straight line without swinging in the front-rear direction and the left-right direction.

As described above, the first guide groove 441 and the first guide protrusions 442 and 442' may be formed directly on the vertically-movable cover 420. Alternatively, the first guide groove 441 and the first guide protrusions 442 and 442' may be coupled onto the vertically-movable cover 420 via separate members.

Referring again to FIGS. 9 to 10, a guide bracket 440 having the first guide groove 441 and the first guide protrusions 442 and 442' may be fixed to the upper rear end of the vertically-movable cover 420. That is, when the vertically-movable cover 420 is engaged with a guide bracket 440, and the guide bracket 440 moves vertically in a straight line along the fixed cover 410, the vertically-movable cover 420 coupled to the guide bracket 440 may be vertically moved in a straight line together with the guide bracket 440.

In addition, the guide bracket 440 may have a connection portion 444 coupled with the protrusion (not shown) protruding inwardly from the upper face of the vertically-movable cover 420. In one example, the connection portion 444 may be fastened with the protrusion (not shown) of the vertically-movable cover 420 using a fastening device including a screw, and the like.

In addition, the first guide protrusions 442 and 442' of the guide bracket 440 may be respectively positioned on both sides of the second guide protrusion 414 of the fixed cover 410 and may be spaced apart from each other to form a pair. In this connection, the first guide groove 441 is provided between the first guide protrusions 442 and 442'. In addition, a wing 443 extending in parallel with the rear wall 416 of the second guide groove 415 and facing the rear wall 416 may be formed on the end of the first guide protrusion 442. In one example, the wing 443 may extend in a direction perpendicular to the first guide protrusion 442.

The wing 443 is supported in face-contact with the rear wall 416 of the second guide groove 415. Thus, the swinging motion of the guide bracket 440 in the front-rear direction and the swinging motion of the guide bracket 440 in the lateral direction may be more reliably reduced.

When, as described above, the first guide protrusions 442 and 442' are provided in a paired form, and the guide bracket 440 has the wing 443 formed on the end of the first guide protrusion 442, the vertically-movable cover 420 is contacted and supported by the fixed cover 410 more reliably during moving in the vertical direction. As a result, the vertically-movable cover 420 may be vertically moved in a straight line, without shaking in the forward and backward directions and the leftward and rightward directions.

In addition, the second guide groove 415 of the fixed cover 410 may receive the first guide protrusion 442 of the guide bracket 440 and the end 424 of the vertically-movable cover 420. Thus, while the guide bracket 440, and the vertically-movable cover 420 to which the guide bracket 440 is coupled may contact and be supported on the fixed cover 410, the vertically-movable cover 420 and guide bracket 440 move vertically. As a result, the coupling force between the vertically-movable cover 420 and the fixed cover 410 may be higher, and, hence, the coupling force between the vertically-movable cover 420 and the guide bracket 440 may also be increased.

In one example, the first guide groove 441 and the first guide protrusions 442 and 442' may be formed to face rearward (toward the main body), while the second guide protrusion 414 and the second guide groove 415 may be formed to face forward (toward the water-outlet module). In addition, the guide bracket 440 may be linearly-contact with the fixed cover 410.

To this end, a protrusion 448 protruding toward the fixed cover 410 from the surface of the guide bracket 440 facing the fixed cover 410 may be formed along the vertical movement direction of the guide bracket 440. When, as described above, the guide bracket 440 repeatedly moves vertically while being in contact with the fixed cover 410, the wear of the fixed cover 410 or the guide bracket 440 may be caused by the friction between the fixed cover 410 and the guide bracket 440.

In order to prevent such a situation, the guide bracket 440 may be made of POM (polyoxymethylene). In this connection, various known engineering plastics having excellent fatigue resistance, toughness, abrasion resistance, and lubricity may be employed in place of POM (polyoxymethylene). Therefore, when the guide bracket 440 moves vertically along the fixed cover 410, wear and noise otherwise caused by friction with the fixed cover 410 may be reduced. Moreover, the manipulation sensitivity the user feels may be improved.

Referring back to FIG. 5, on each of both sides of the vertically-movable cover 420, an outwardly projecting handle 425 may be formed. A seat groove 419 on which the handle 425 is seated may be formed on each of both sides of the fixed cover 410. In this connection, a shoulder 425a may be formed at the upper end of the handle 425. Thus, when the user holds the handle 425 and lifts the vertically-movable cover 420 upwards and, thus, the cover 420 reaches the maximum elevation height, the shoulder 425a of the handle 425 may be engaged with the seat groove 419. That is, the seat groove 419 and the handle 425 may serve as a stopper for restricting the elevation height of the vertically-movable cover 420.

In addition, the handle 425 may be formed to have a grip groove 425b recessed inwardly therein. When, as described above, the grip groove 425b is formed, the user may grip or lift the vertically-movable cover 420 by gripping the grip groove 425b. In this connection, the user may lower or lift the vertically-movable cover 420 without slipping on the handle.

In another example, along the outer perimeter of the bottom of the vertically-movable cover 420, a horizontally projecting flange 426 may be formed. The flange 426 may be in contact with the bottom of the fixed cover 410 at the maximum rise of the vertically-movable cover 420.

In addition, the flange 426 may protrude outward beyond the fixed cover 410. That is, the outer diameter of the flange 426 may be larger than the outer diameter of the fixed cover 410. Thus, with the vertically-movable cover 420 being fully housed within the fixed cover 410, the user may hold the flange 426 and lower the vertically-movable cover 420. In addition, the flange 426 may serve as a stopper for limiting the elevation height of the vertically-movable cover 420.

Referring back to FIG. 7, the vertically-movable cover 420 or the fixed cover 410 may have a stopping mechanism for preventing the vertically-movable cover 420 from further descending from the maximum descent position of the vertically-movable cover 420 when the cover moves down. Likewise, the vertically-movable cover 420 or the fixed cover 410 may have a further stopping mechanism that stops the vertically-movable cover 420 from further rising when the vertically-movable cover 420 is at its maximum height.

If the stopping mechanism is not present, it is difficult for the user to recognize the maximum rise height and the maximum fall height of the vertically-movable cover 420. Thus, while the vertically-movable cover 420 is descending, the cover 420 may fall out of the fixed cover 410. Further, during the elevation of the vertically-movable cover 420, the bottom of the vertically-movable cover 420 may enter the inside of the fixed cover 410.

In order to avoid this situation, the stopping mechanism is provided which is configured to constrain the descending or rising motion of the vertically-movable cover 420 when the vertically-movable cover 420 is lowered or raised to a set maximum falling or rising level.

In one example, the stopping mechanism may include a stopping protrusion 445 formed to protrude outward from the guide bracket 440 coupled to the top of the vertically-movable cover 420 or to the top of the vertically-movable cover 420, and a stopping groove 417 defined inwardly and concavely in the top and/or bottom of the fixed cover 410 to accommodate the stopping protrusion 445. Thus, when the vertically-movable cover 420 is lowered or raised to its maximum level, the stopping protrusion 445 is received within and engaged with the stopping groove 417, the descending or rising motion of the vertically-movable cover 420 may be constrained.

In contrast, the stopping groove may be defined in the guide bracket 440 coupled to the top of the vertically-movable cover 420 or to the top of the vertically-movable cover 420, while the stopping protrusion may protrude from the top and/or bottom of the fixed cover 410. Referring to FIG. 10, at both sides of the stopping protrusion 445, both elongate slots 446 may be formed therein (see section (a) of FIG. 10).

The stopping protrusion 445 may be provided on a rib 447 provided between the elongate slots 446. The rib 447 has a small width and thus is easily deformed elastically. As a result, the stopping protrusion 445 may be resiliently inserted into the stopping groove 417 or resiliently separated from the stopping groove 417.

In another example, the first guide protrusion 442' may take a U-shaped bent shape (see section (b) of FIG. 10). In this connection, one end of the first guide protrusion 442' is fixed to the guide bracket 440, while the other end thereof is spaced from the guide bracket 440, thereby defining a slit S.

Therefore, the other end of the first guide protrusion 442' is easily deformed elastically. As a result, the stopping protrusion 445 formed on the other end of the first guide protrusion 442' may be resiliently inserted into the stopping groove 417 or resiliently separated from the stopping groove 417. In addition, a shoulder 418 protruding inward may be formed on the bottom of the fixed cover 410.

The shoulder 418 is engaged with the bottom of the guide bracket 440 and restrains the bottom when the vertically-movable cover 420 is at its maximum descent. The shoulder 418 may more reliably prevent the vertically-movable cover 420 from falling below the maximum descent level.

In addition, the stopping protrusion 445 or the stopping groove 417 may be formed along the periphery of the vertically-movable cover 420 or the fixed cover 410. In this case, the fastening force between the stopping protrusion 445 and the stopping groove 417 is strengthened. This more reliably prevents the vertically-movable cover 420 from falling below the maximum descent level.

Figure 11:
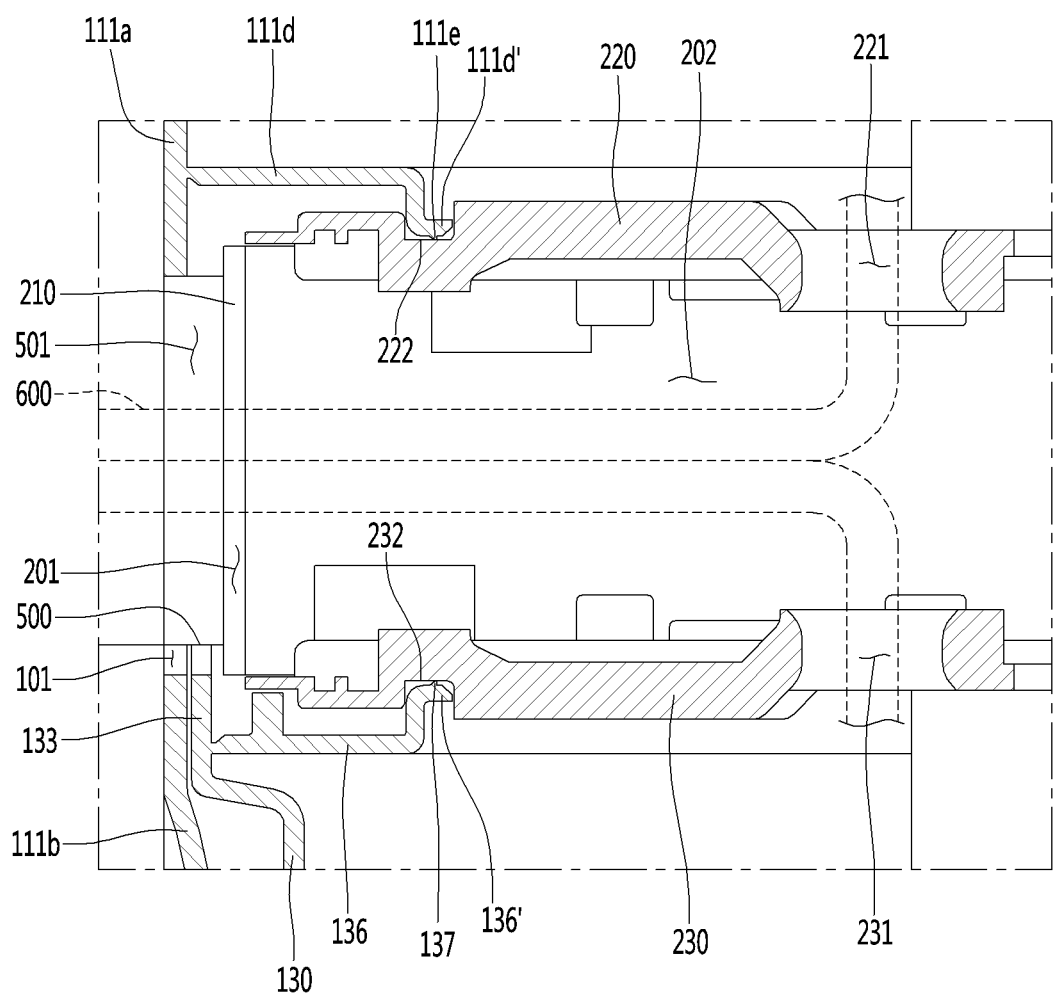
FIG. 11 is a vertical cross-sectional view showing a connection structure between the main body and the rotator as one component of the present disclosure.

FIG. 11 is a vertical cross-sectional view showing the connection structure between the rotator as one component of the present disclosure and the main body. Hereinafter, the rotator as another main component of the present disclosure will be exemplified The water-outlet module 400 is connected to the rotator 200, and rotates together with the rotator 200 such that the module 400 varies the horizontal position of the water-discharge nozzle 430. Referring to FIG. 6 and FIG. 11, the rotator 200 includes a circular rotator body 210 having a hollow space 202 defined therein, an upper disk 220 fixed at an upper level of the rotator body 210, and a lower disk 230 fixed at a lower level thereof.

The rotator body 210 and the upper disk 220, and the lower disk 230 may be combined into a single module in a manner including assembly and the like. In one example, a plurality of the first seat protrusions, on which the bottom of the upper disc 220 is seated, are formed on an inner face of the upper level of the rotator body 210, while a plurality of second seat protrusions may be formed on the inner face of the lower level of the body 21. The top of the lower disk 230 may be seated on the second seat protrusions.

In addition, the first seat protrusion and the upper disk may be integrally combined using fastening devices including screws and the like. Likewise, the second seat protrusion and the lower disk may be integrally combined using fastening devices including screws and the like. In one embodiment, a central portion of each of the upper disk 220 and the lower disk 230 may have through-holes 221 and 231 defined therein communicating with the hollow space 202 of the rotator body 210.

The through-holes 221 and 231 may be positioned coaxially with the rotation center of the rotator 200. The through-holes 221 and 231 are formed to inform the operator of the installed positions of the purified water pipe and hot water pipe through which discharged water flows.

In one example, through the through-holes 221 and 231, the hot water pipe, the purified water pipe, and the cold water pipe may be introduced into the rotator 200. The hose 600, which includes the hot water pipe, the purified water pipe, and the cold water pipe entering the rotator 200 passes through the fluid channel 201 of the rotator 200, the fluid channel 501 of the bridge 500, the fluid channel 412 of the fixed cover 410 and the fluid channel 422 of the vertically-movable cover 420, and, subsequently, enters the accommodation space 421 of the vertically-movable cover 420 and then connects to the water outlet nozzle 430 via a connection member 700. Accordingly, purified water, hot water, and cold water generated from the main body 100 may be transferred to the water-outlet nozzle 430, respectively.

In one embodiment, the rotator 200 is rotatably mounted within the main body 100. In one example, in the main body 100, first and second extensions 111*d* and 136 protruding inward along the periphery of the inner surface of the main body 100 are respectively formed at the upper level and the lower level of the opening 101. Correspondingly, upper and lower guide grooves 222 and 232 may be formed in the top face of the upper disk 220 and the bottom face of the lower disk 230 to respectively receive ends of the first and second extensions 111*d* and 136, respectively.

At least portions of the first and second extensions 111*d* and 136 and corresponding upper and lower guide grooves 222 and 232 may be formed in an arc shape. In one example, each of the first and second extensions 111*d* and 136 may be formed in a semicircular shape, while each of the guide grooves 222 and 232 may be circular.

In this embodiment, the first extension 111*d* may extend from the inner surface of the upper cover 111*a*, while the second extension 136 may extend from the top of the filter bracket 130. In one embodiment, the second extension may extend from the inner surface of the lower cover 111*b*.

Accordingly, while the ends of the first and second extensions 111*d* and 136 are received in the guide grooves 222 and 232, respectively, the rotator 200 may be rotatably mounted on the main body 100. In this embodiment, a first guide protrusion 111*d*' extending downward may be formed at an end of the first extension 111*d*, while a second guide protrusion 136' extending upward may be formed at an end of the second extension 136. In one example, the first guide protrusion 111*d*' may have an L-shaped cross section, while the second guide protrusion 136' may have an inverted L-shaped cross-section.

The first guide protrusion 111*d*' and the second guide protrusion 136' are accommodated in the guide grooves 222 and 232, respectively. As a result, the rotator 200 may be rotatably mounted to the main body 100. Furthermore, guide ribs 111*e* and 137 are respectively formed on the bottom of the first guide protrusion 111*d*' and on the top of the guide protrusion 136' so as to be in a linearly-contact manner with the guide grooves 222 and 232, respectively.

In this connection, at least a portion of each of the first and second guide protrusions 111*d*' and 136' and the guide ribs 111*e* and 137 may be formed in an arc shape. In one example, each of the first and second guide protrusions 111*d*' and 136' and guide ribs 111*e* and 137 may be semicircular.

When as described above, the upper and lower disks 220 and 230 and the first and second extensions 111*d* and 136 are linearly-contacted via the guide ribs 111*e* and 137, respectively, the frictional force between the rotator 200 and the main body 100 may be reduced to a minimum. At the same time, the rotator 200 may be contacted and supported by the main body 100, whereby the rotation of the rotator 200 may be stabilized. Moreover, the user may rotate the rotator 200 without applying great force, so that the manipulation sensitivity felt by the user may be improved.

In one example, each of the guide ribs 111*e* and 137 may have a convex semicircular vertical cross-section. When the shape of each of the guide ribs 111*e* and 137 is curved as described above, the rotational motion of the rotator 200 may proceed more smoothly with the upper disk 220 and the lower disk 230 being in linearly-contact with the first and second extensions 111*d* and 136 respectively.

Further, while as described above, the guide ribs 111*e* and 137 are linearly-contacted with the upper disk 220 and the lower disk 230, respectively, the rotator 200 rotates repeatedly. Thus, the friction between the guide ribs 111*e* and 137 and the upper disk 220 and the lower disk 230 respectively may cause wear thereof.

In order to prevent such a situation, at least one of the upper disk 220 and the lower disk 230 or at least one of the guide ribs 111*e* and 137 may be made of POM (polyoxymethylene). Alternatively, instead of POM (polyoxymethylene), various known engineering plastics having excellent fatigue resistance, toughness, abrasion resistance, and lubricity may be adopted.

Therefore, when the disks 220 and 230 are repeatedly rotated while the upper disk 220 and the lower disk 230 are linearly-contacted with the guide ribs 111*e* and 137, respectively, wear and noise due to the friction between the guide ribs 111*e* and 137 and the disks 220 and 230 may be reduced. Moreover, the manipulation sensitivity the user feels may be improved.

In one embodiment, the top cover 114 may be provided on the top of the upper cover 111*a*. The top-cover 114 defines the top face of the purification device 10. The manipulation structure 300 is rotatably mounted on the top-cover 114.

Figure 12:
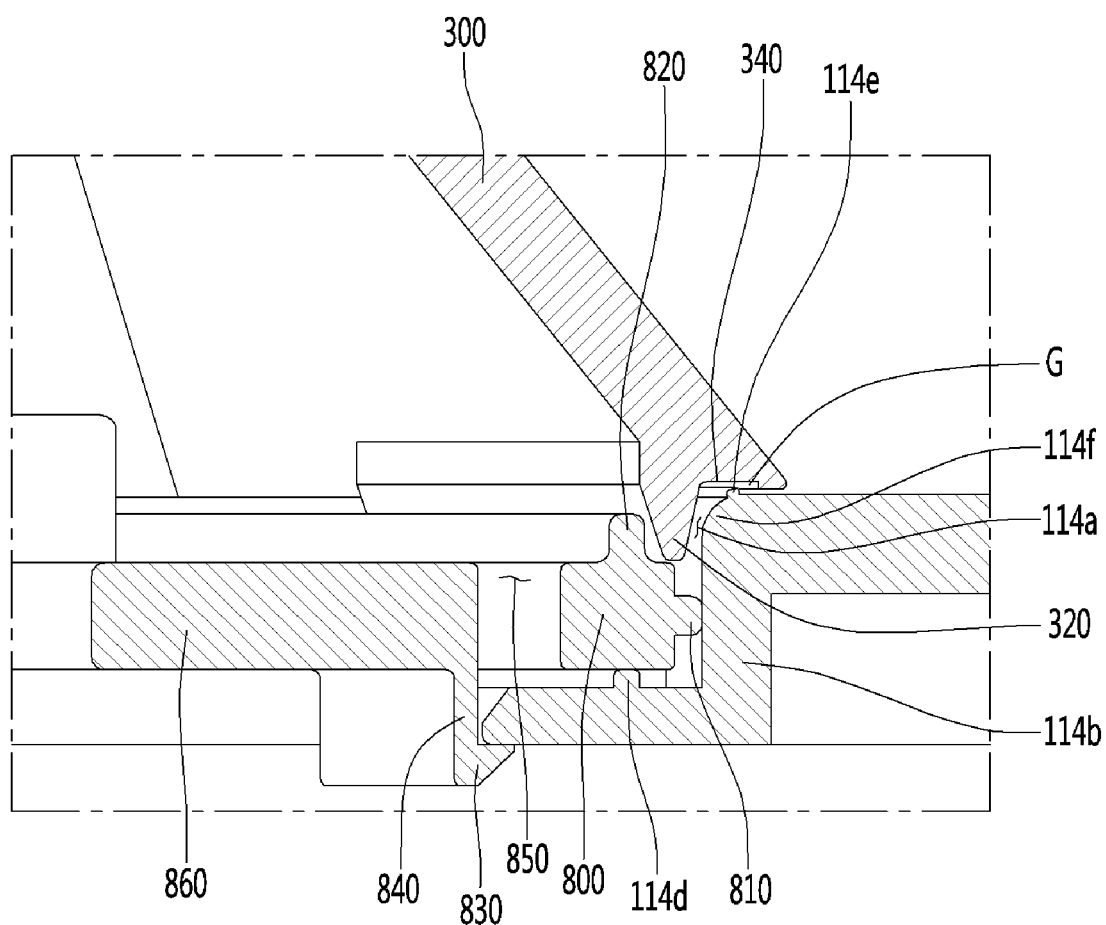
FIG. 12 is a vertical cross-sectional view showing a connection structure between the manipulation structure as one component of the present disclosure and the main body.
Figure 13:
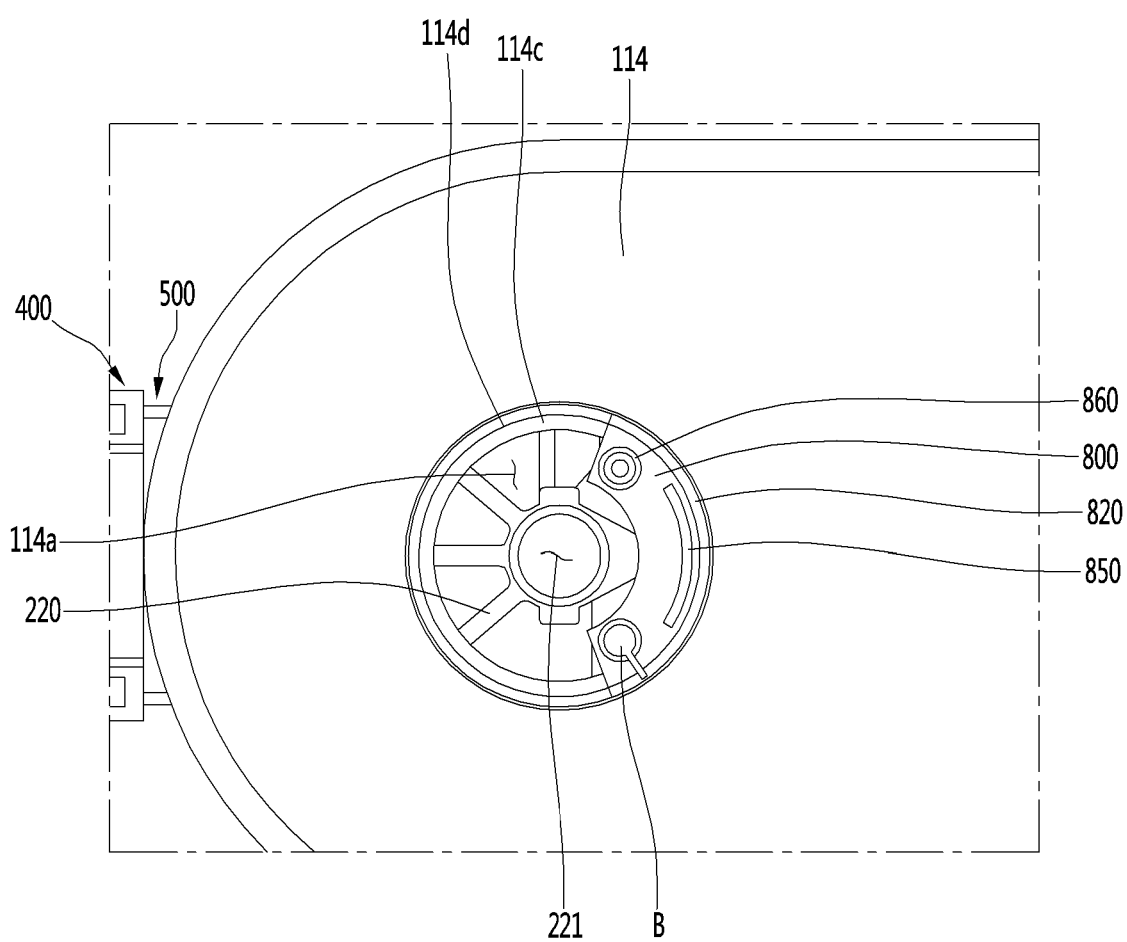
FIG. 13 is a plan view of the main body as viewed from above, with the manipulation structure being separated therefrom.
Figure 14:
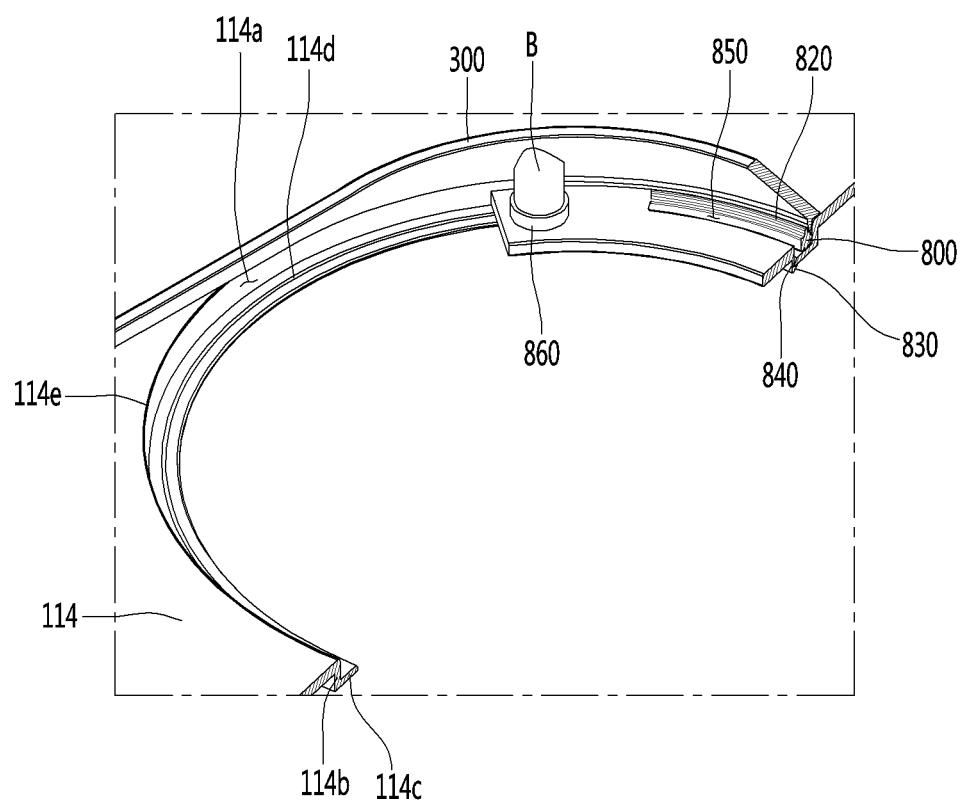
FIG. 14 is a partially cutaway perspective view showing a connection structure between the manipulation structure as one component of the present disclosure and the main body.

Hereinafter, the manipulation structure will be described in more detail. FIG. 12 is a vertical sectional view showing a connection structure between the manipulation structure as one component of the present disclosure and the main body. FIG. 13 is a top view of the main body viewed from above with the manipulation structure being removed therefrom. FIG. 14 is a partially cutaway perspective view showing the connection structure between the manipulation structure as one component of the present disclosure and the main body.

Referring to FIGS. 12 to 14, the manipulation structure 300 is rotatably mounted on the top face of the main body 100, that is, the top-cover 114. The manipulation structure 300 rotates together with the water-outlet module 400 by a rotational force applied to the water-outlet module 400. That is, when a user applies the rotational force to the water-outlet module 400 to rotate the water-outlet module 400, the rotator 200, which is connected to the water-outlet module 400, rotates. At the same time, the manipulation structure 300 connected to the top of the water-outlet module 400 also rotates.

In this connection, the rotation axis of the manipulation structure 300 and the rotation axis of the rotator 200 may be arranged coaxially. In order to rotatably couple the manipulation structure 300 to the top face of the main body 100 as described above, a rotation-hole 114a is formed in the top face of the main body 100, that is, the top-cover 114. Further, the bottom of the manipulation structure 300 is inserted into the rotation-hole 114a. Thus, the unit 300 may rotate in and along the rotation-hole 114a.

In this connection, the manipulation structure 300 may shield the rotation-hole 114a so that the rotation-hole 114a is not exposed to the outside. That is, the size of the rotation-hole 114a may be smaller than the size of the manipulation structure 300.

In one embodiment, the manipulation structure 300 needs to be rotatably secured to the top-cover 114 so that the bottom of the manipulation structure 300 is not separated upward from the hole during the rotation while the bottom of the manipulation structure 300 is inserted into the rotation-hole 114a. To this end, the bottom of the manipulation structure 300 may have a seat groove defined therein into which the inner edge of the top-cover 114 having the rotation-hole 114a is fitted.

In another example, the manipulation structure 300 may be rotatably secured to the top-cover 114 via a separate coupling member. Hereinafter, the connection structure between the manipulation structure 300 and the top-cover 114 will be described in more detail.

At the edge of the top-cover 114 defining the rotation-hole 114a, a vertical portion 114b extending downward and a horizontal portion 114c extending inward from the bottom of the vertical portion 114b may be formed. In this connection, a corner 114f is formed between the edge of the top-cover 114 defining the rotation-hole 114a and the vertical portion 114b. The bottom of the manipulation structure 300 may have a horizontally protruding seated portion 340 to be seated on the corner 114f.

The rotation-hole 114a may be covered by the seated portion 340.

In addition, a rotatable bracket 800 may be provided between the manipulation structure 300 and the top-cover 114. The rotatable bracket 800 is supported in contact with the top and bottom of the horizontal portion 114c, respectively, and rotates along the horizontal portion 114c. The rotatable bracket 800 is fixed to the manipulation structure 300. Thus, the rotatable bracket 800 and the manipulation structure 300 are joined together. Thereby, when the rotatable bracket 800 rotates along the horizontal portion 114c, the manipulation structure 300 may also rotate together with the rotatable bracket 800. At least a portion of the rotatable bracket 800 may have an arc shape. In one example, the rotatable bracket 800 may have a sector shape.

In addition, the rotatable bracket 800 has a rotation-guide rib 810 protruding outwardly from its surface facing the horizontal portion 114c or the vertical portion 114b. The rotation-guide rib 810 may be linearly-contact with the horizontal portion 114c or the vertical portion 114b.

In another example, a rotation-guide rib 114d may be protruded from the horizontal portion 114c or the vertical portion 114b so as to be in a linearly-contact manner with the rotatable bracket 800.

When as described above, the rotatable bracket 800 and the horizontal portion 114c or the vertical portion 114b are linearly-contacted with each other, the frictional force between the rotatable bracket 800 and the horizontal portion 114c or the vertical portion 114b is reduced to a minimum. Thus, the configuration that the rotatable bracket 800 and the horizontal portion 114c or the vertical portion 114b bear against each other in a linearly-contacting manner with each other may allow the rotation operation of the rotatable bracket 800 to be stably performed.

Moreover, the user does not need to apply much force to the manipulation structure 300 connected to the rotatable bracket 800 to be rotated, so that the manipulation sensitivity felt by the user may be improved. Furthermore, the rotatable bracket 800 has an upper support rib 820 protruding upward from its top face. The manipulation structure 300 may have a seat protrusion 320 that protrudes from its bottom and is inserted into the space between the upper support rib 820 and the vertical portion 114b.

Thus, the coupling force between the rotatable bracket 800 and the manipulation structure 300 and the top-cover 114 may be further improved. In addition, the top-cover 114 may have, on the top face thereof, a spacer rib 114e protruding upward from the edge of the rotation-hole 114a.

The spacer rib 114e as described above allows the seated portion 340 to be linearly-contacted with the top-cover 114. As a result, the frictional force between the manipulation structure 300 and the top-cover 114 may be further reduced. In addition, the rotatable bracket 800 has the following features: an extension 840 extending downward from the bottom of the rotatable bracket 800, and a hook 830 formed at the bottom of the extension 840 and engaged with the bottom of the horizontal portion 114c, and stopped by the portion 114c.

Thus, the rotatable bracket 800 may be elastically fitted with and fastened to the horizontal portion 114c. In this embodiment, an arc-shaped cutout 840 may be formed in the rotatable bracket 800. The extension 840 may extend from the cutout 840.

Due to the presence of the cutout 840, the extension 840 and the hook 830 can be elastically deformed. Further, the rotatable bracket 800 may be resiliently fitted with and fastened to the horizontal portion 114c. In addition, the rotatable bracket 800 may be provided with a connection portion 860 extending horizontally inward. The rotatable bracket 800 and the manipulation structure 300 may be connected via the connection portion 860.

In one example, the connection portion 860 of the rotatable bracket 800 may be coupled to the manipulation structure 300 using fastening devices including bolts, screws, etc. For this purpose, a boss B may be provided inside a rotatable bracket 800 or the manipulation structure 300. In addition, the rotatable bracket 800 may space at least a portion of the manipulation structure 300 from the top face of the main body 100, that is, the top-cover 114.

In one example, when the height of the upper support rib 820 is smaller than the height of the seat protrusion 320, a gap G may be defined between the seated portion 340 and the top-cover 114. In this case, the frictional force applied to the manipulation structure 300 is further reduced such that the rotational motion of the manipulation structure 300 may proceed more smoothly.

In one embodiment, when as described above, the rotatable bracket 800 is linearly-contacted with and supported on the top-cover 114, the bracket 800 is rotated repeatedly. This may cause noise due to the friction between the rotatable bracket 800 and the top-cover 114. Further, in the contact area between the rotatable bracket 800 and the top-cover 114, wear may occur. Furthermore, manipulation for rotation of the manipulation structure 300 by the user may be difficult.

In order to prevent such a situation, the rotatable bracket 800 and the top-cover 114 may be made of different materials. In one example, one of the rotatable bracket 800 and the top-cover 114 may be made of one of ABS resin (acrylonitrile-butadiene-styrene) resin and POM (polyoxymethylene), while the other of the rotatable bracket 800 and the top-cover 114 may be made of the other of ABS resin (acrylonitrile-butadiene-styrene resin) and POM (polyoxymethylene). Alternatively, various known engineering plastics having excellent lubricity, fatigue resistance, toughness, abrasion resistance and the like may be employed in place of POM (polyoxymethylene).

Therefore, when the rotatable bracket 800 and the manipulation structure 300 are rotated, wear and noise due to the friction between the rotatable bracket 800 and the top-cover 114 can be reduced. Moreover, the feeling of manipulation that the user feels may be improved. In addition, the top face 330 of the manipulation structure 300 may be formed as an inclined face whose height is reduced in a direction closer to the water-outlet module. Accordingly, the manipulation structure 300 may improve the manipulation convenience and readability of the user while improving manipulation performance thereof by the user.

The following is an example of 'tray' as one component of the present disclosure. Referring again to FIGS. 1 to 4, the tray 900 is connected to the base 113 so as to protrude forward of the front-cover 111. In addition, the tray 900 may be positioned vertically below the water-outlet module 400. Further, the tray 900 may be rotated by manipulation of the user. The tray may be separated from the base 113. The tray 900 may also have a grill formed rightly below the water-outlet nozzle 430 so that the tray 900 may receive water falling from the water-outlet nozzle 430.

The tray 900 has a rotatable ring 910 rotatably mounted on the base 113. Thus, the tray 900 may be rotated by the rotatable ring 910 while being mounted on the base 113. The base 113 defines the bottom face of the purification device 10. The periphery of the base 113 may extend upward and then be coupled with the side-panel 115, the front-cover 111, and the rear-cover 112.

The rotatable ring 910 formed at the rear portion of the bottom surface of the tray 900 may be rotatably mounted onto a front portion of the base 113. The tray 900 may be rotated in both left and right directions by the rotatable ring 910.

The front portion of the top of the base 113 may be formed to be lower than the rear portion of the top of the base 113. Thus, a stepped portion may be formed. Further, an opening is defined between the front portion of the base 113 and the bottom portions of the front-cover 111 and the side panel 115. Thus, the tray 900 may be rotated in the left and right directions through the opening.

Furthermore, the stepped portion between the front portion and the rear portion of the base 113 functions as a stopper for limiting the rotation angle of the tray 900 when the tray 900 is rotated. Further, when the tray 900 is rotated, both sides of the tray 900 are brought into contact with the stopper, whereby rotation of the tray 900 may be restricted.

Aspects of the present disclosure is to provide a purification device in which a water-outlet nozzle may be freely changed in position by vertically moving or rotating the water-outlet nozzle while coupling the water-outlet nozzle to a main body. In addition, aspects of the present disclosure provide a purification device in which a maximum rise level of the water-outlet nozzle may be further higher, and a maximum descent level may be further lowered, and, as a result, the vertical level change range of the water-outlet nozzle may become larger.

In addition, aspects of the present disclosure provide a purification device in which a top of the water-outlet module may be supported on the main body via a manipulation structure, and a bottom or middle portion of the water-outlet module may be secondarily supported on the main body via a rotator, such that the water-outlet module may be connected more rigidly to the main body.

In addition, aspects of the present disclosure provide a purification device in which during the rotation or vertical movement of the water-outlet module, the water-outlet module may be prevented from vibrating such that the rotation or vertical movement of the water-outlet module may be more stable. Moreover, aspects of the present disclosure provide a purification device in which a large space for receiving a container is secured under the water-outlet nozzle, which allows water to be received in containers of various sizes.

Moreover, aspects of the present disclosure provide a purification device in which the operation of rotating or vertically moving the water-outlet module in order to change the position of the water-outlet nozzle may proceed at a smooth and constant speed. Furthermore, aspects of the present disclosure provide a purification device in which the position of the water-outlet nozzle may be changed to be adapted to various installation environments.

Furthermore, aspects of the present disclosure provide a purification device in which water falling from the water-outlet nozzle may be prevented from splashing out of the cup due to a gravity. Furthermore, aspects of the present disclosure provide a purification device in which when the user holds the water-outlet nozzle and descends the same to the target position and then the user releases his/her hand from the nozzle, the water-outlet nozzle may be fixed at the target position.

Moreover, aspects of the present disclosure provide a purification device in which the vertical movement of the rotator and movable cover with the water-outlet nozzle may be straight. In addition, aspects of the present disclosure provide a purification device in which the vertical movement of the rotator and movable cover with the water-outlet nozzle may proceed smoothly.

In addition, aspects of the present disclosure provide a purification device in which the vertical movement of the rotator and the movable cover with the water-outlet nozzle may proceed accurately to the target height as designated by the user. In addition, aspects of the present disclosure provide a purification device in which in the process of vertically moving the rotator and movable cover equipped with the water-outlet nozzle, the feeling of manipulation felt by the user may be improved.

In addition, aspects of the present disclosure provide a purification device in which the rotator and movable cover equipped with the water-outlet nozzle may be vertically moved in the forward or backward direction or in the left-right direction without vibrating. Moreover, aspects of the present disclosure provide a purification device in which the user may rotate the tray to the target position and freely detach and attach the tray, thereby improving the user's convenience.

In addition, aspects of the present disclosure provide a purification device in which various components thereof are not exposed to the outside, so that the purification device is apparently beautiful. Moreover, aspects of the present disclosure provide a purification device that may be hygienic and may prevent breakage and deformation of the water-outlet nozzle. In addition, aspects of the present disclosure provide a purification device in which since the manipulation structure is highly visually recognizable by the user, a user with a small height as well as an adult user may recognize the manipulation structure easily.

In one aspect of the present disclosure, a purification device may comprise: a main body having an open opening in a horizontal direction in a front-face thereof; a rotator positioned in the opening to be rotatably mounted on the main body; a manipulation structure spaced from and above the rotator and rotatably connected to a top face of the main body, wherein at least a portion of the manipulation structure protrudes forward of the main body; and a water-outlet module including; a fixed cover fixed to the rotator through the opening, wherein the fixed cover protrudes forward of the main body, and a top of the fixed cover is connected to a bottom of the manipulation structure; a vertically-movable cover vertically movable while being held in contact with the fixed cover; and a water-outlet nozzle mounted onto a bottom of the vertically-movable cover; wherein when the vertically-movable cover rises to a highest level, a top of the vertically-movable cover is located in a space between the rotator and the manipulation structure.

In one implementation of the device, the fixed cover has a vertical-movement enabling space defined therein, wherein the vertically-movable cover is received in the vertical-movement enabling space in the fixed cover and moves vertically in the vertical-movement enabling space to vary a vertical level of the water-outlet nozzle.

In one implementation of the device, the vertically-movable cover or the fixed cover includes a resisting protrusion, wherein the resisting protrusion is configured to reduce a vertically-moving force applied to the vertically-movable cover for vertical movement of the vertically-movable cover. In one implementation of the device, the vertically-movable cover or the fixed cover includes a guide configured to guide the movable cover such that the vertically-movable cover moves vertically in a straight line.

In one implementation of the device, the vertically-movable cover or the fixed cover has a stopping mechanism configured to block further descent of the vertically-movable cover when the vertically-movable cover reaches a maximum descent level. In one implementation of the device, the rotator includes a rotator body having a hollow space, an upper disk fixed at an upper level of the rotator body, and a lower disk fixed at a lower level of the rotator body.

In one implementation of the device, the manipulation structure rotates together with the water-outlet module upon rotation of the water-outlet module. In one implementation of the device, a rotation-hole is defined in a top face of the main body, wherein the manipulation structure is configured to rotate along an inner circumference of the rotation-hole.

In one implementation of the device, an edge of the main body defining the rotation-hole has a vertical portion extending downward and a horizontal portion extending inward from a bottom of the vertical portion. In one implementation of the device, the device further comprises a rotatable bracket secured to the manipulation structure, wherein the rotatable bracket rotates along the horizontal portion while bearing against a top and a bottom of the horizontal portion. In one implementation of the device, the rotatable bracket has a rotation-guide rib protruding outward from a face of the rotatable bracket facing the horizontal portion or the vertical portion, wherein the rotatable bracket linearly-contacts the horizontal portion or the vertical portion via the rib.

In accordance with aspects of the present disclosure, a water-outlet nozzle may be freely changed in position by vertically moving or rotating the water-outlet nozzle while coupling the water-outlet nozzle to a main body. In addition, in accordance with aspects of the present disclosure, a maximum rise level of the water-outlet nozzle may be further higher, and a maximum descent level may be further lowered, and, as a result, the vertical level change range of the water-outlet nozzle may become larger.

In addition, in accordance with aspects of the present disclosure, a top of the water-outlet module may be supported on the main body via a manipulation structure, and a bottom or middle portion of the water-outlet module may be secondarily supported on the main body via a rotator, such that the water-outlet module may be connected more rigidly to the main body. In addition, in accordance with aspects of the present disclosure, during the rotation or vertical movement of the water-outlet module, the water-outlet module may be prevented from vibrating such that the rotation or vertical movement of the water-outlet module may be more stable.

Moreover, in accordance with aspects of the present disclosure, a large space for receiving a container is secured under the water-outlet nozzle, which allows water to be received in containers of various sizes. Moreover, in accordance with the present disclosure, the operation of rotating or vertically moving the water-outlet module in order to change the position of the water-outlet nozzle may proceed at a smooth and constant speed.

Furthermore, in accordance with aspects of the present disclosure, the position of the water-outlet nozzle may be changed to be adapted to various installation environments. Furthermore, in accordance with aspects of the present disclosure, water falling from the water-outlet nozzle may be prevented from splashing out of the cup due to gravity.

Furthermore, in accordance with aspects of the present disclosure, when the user holds the water-outlet nozzle and descends the same to the target position and then the user releases his/her hand from the nozzle, the water-outlet nozzle may be fixed at the target position. Moreover, in accordance with aspects of the present disclosure, the vertical movement of the rotator and movable cover with the water-outlet nozzle may be straight.

In addition, in accordance with aspects of the present disclosure, the vertical movement of the rotator and movable cover with the water-outlet nozzle may proceed smoothly. In addition, in accordance with aspects of the present disclosure, the vertical movement of the rotator and the movable cover with the water-outlet nozzle may proceed accurately to the target height as designated by the user.

In addition, in accordance with aspects of the present disclosure, in the process of vertically moving the rotator and movable cover equipped with the water-outlet nozzle, the feeling of manipulation felt by the user may be improved. In addition, in accordance with aspects of the present disclosure, the rotator and movable cover equipped with the water-outlet nozzle may be vertically moved in the forward or backward direction or in the left-right direction without vibrating.

Moreover, in accordance with aspects of the present disclosure, the user may rotate the tray to the target position and freely detach and attach the tray, thereby improving the user's convenience. In addition, in accordance with aspects of the present disclosure, various components thereof are not exposed to the outside, so that the purification device is apparently beautiful.

Moreover, in accordance with aspects of the present disclosure, the purification device may be hygienic and may prevent breakage and deformation of the water-outlet nozzle. In addition, in accordance with aspects of the present disclosure, since the manipulation structure is highly visually recognizable by the user, a user with a small height as well as an adult user may recognize the manipulation structure easily.

While the present disclosure has been illustrated with reference to the accompanying drawings, it is to be understood that the present disclosure is not limited to the embodiments and drawings as disclosed in the present specification. It will be obvious that various modifications may be made by those skilled in the art within the scope of the technical idea of the present disclosure. In addition, it should be recognized that other effects from the configurations of the present disclosure should be acknowledged although the other effects is not explicitly described in the specification.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the present disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A device comprising:
a main body having a front face that includes an opening;
a rotator provided in the opening to be rotatably mounted on the main body and to rotate horizontally in the opening;
a handle provided above and spaced apart from the rotator and rotatably connected at a top face of the main body, wherein at least a portion of the handle protrudes forward of the opening of the main body; and
an outlet including:
a first cover fixed to the rotator through the opening, wherein the first cover protrudes forward of the main body, and a top of the first cover is connected to a bottom of the handle;
a second cover that is vertically movable while being held in contact with the first cover; and
an outlet nozzle mounted at a bottom of the second cover,
wherein when the second cover rises to a highest level, a top of the second cover is located between the rotator and the handle,
wherein a first space is defined in the first cover, and
wherein the second cover is received in the first space in the first cover and moves vertically in the first space to vary a vertical level of the outlet nozzle.

2. The device of claim 1, wherein at least one of the first cover or the second cover includes at least one resisting protrusion, and wherein the resisting protrusion is configured to reduce a vertically moving force applied to the second cover for vertical movement of the second cover.

3. The device of claim 2, wherein the at least one resisting protrusion protrudes outward from a face of the second cover facing the first cover and extends in a vertical direction to linearly contact the first cover.

4. The device of claim 2, wherein the at least one resisting protrusion protrudes outward from a face of the first cover facing the second cover and extends in a vertical direction to linearly contact the second cover.

5. The device of claim 1, wherein the first cover and the second cover are made of different materials.

6. The device of claim 5, wherein one of the first cover or the second cover is made of one of acrylonitrile-butadiene-styrene (ABS) resin or polyoxymethylene (POM), and wherein the other of the first cover or the second cover is made of other one of acrylonitrile-butadiene-styrene (ABS) resin or polyoxymethylene (POM).

7. The device of claim 1, wherein at least one of the first cover or the second cover includes a guide configured to control a movement of the second cover such that the second cover moves vertically in a straight line.

8. The device of claim 7, wherein the second cover has at least one of a first guide groove recessed inwardly therein or a first guide protrusion protruding outwardly therefrom,
wherein the first cover has at least one of a second guide protrusion inserted into the first guide groove or a second guide groove accommodating the first guide protrusion, and
wherein each of the first and second guide grooves and protrusions extends in a vertical direction.

9. The device of claim 8, wherein the second cover has a guide bracket having the first guide groove or the first guide protrusion.

10. The device of claim 9, wherein the second guide groove of the first cover receives therein the first guide protrusion of the guide bracket and an end of the second cover.

11. The device of claim 1, wherein at least one of the first cover or the second cover has a stopping mechanism configured to block further descent of the second cover when the second cover reaches a lowest level.

12. The device of claim 11, wherein the stopping mechanism includes:
a stopping protrusion protruding outward from the top of the second cover; and
a stopping groove defined inwardly in a bottom of the first cover to receive the stopping protrusion.

13. The device of claim 12, wherein the stopping protrusion is formed along a perimeter of the second cover, or the stopping groove is formed along a perimeter of the first cover.

14. The device of claim 1, wherein the second cover has at least one of:
a flange protruding outwardly from the bottom of the second cover to contact a bottom of the first cover when the second cover rises to the highest level, or
at least one outwardly projecting handle formed on an outer surface of the second cover, the outwardly projecting handle including a shoulder that contacts a seat groove formed on a side of the first cover when the second cover rises to the highest level.

15. The device of claim 1, wherein the handle is configured to rotate together with the outlet upon rotation of the outlet.

16. The device of claim 15, wherein a rotation hole is defined in a top face of the main body, and wherein the handle is configured to rotate along an inner circumference of the rotation hole.

17. The device of claim 16, wherein an edge of the main body defining the rotation hole has a vertical portion extending downward and a horizontal portion extending inward from a bottom of the vertical portion.

18. The device of claim 17, wherein the device further comprises:
a rotatable bracket secured to the handle, wherein the rotatable bracket rotates along the horizontal portion while bearing against a top and a bottom of the horizontal portion.

19. The device of claim 18, wherein the rotatable bracket has a rotation guide rib protruding outward from a face of the rotatable bracket facing at least one of the horizontal portion or the vertical portion, and wherein the rotatable bracket linearly contacts the horizontal portion or the vertical portion via the rib.

* * * * *